US011027659B2

(12) United States Patent
Arendsen et al.

(10) Patent No.: US 11,027,659 B2
(45) Date of Patent: Jun. 8, 2021

(54) VEHICLE INTERIOR COMPONENT

(71) Applicant: Shanghai Yanfeng Jinqiao Automotive Trim Systems Co. Ltd., Novi, MI (US)

(72) Inventors: Randy Len Arendsen, Zeeland, MI (US); Tyler T. Grab, Grand Rapids, MI (US); Adam R. Gofton, West Olive, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 17/104,517

(22) Filed: Nov. 25, 2020

(65) Prior Publication Data
US 2021/0078500 A1 Mar. 18, 2021

Related U.S. Application Data

(63) Continuation of application No. PCT/US2019/066569, filed on Dec. 16, 2019.
(Continued)

(51) Int. Cl.
*B60J 7/00* (2006.01)
*B60R 7/04* (2006.01)
*B60R 7/06* (2006.01)

(52) U.S. Cl.
CPC ............... *B60R 7/04* (2013.01); *B60R 7/046* (2013.01); *B60R 7/06* (2013.01)

(58) Field of Classification Search
CPC ........... B29C 66/71; A45D 4/16; B25C 5/025; B29K 2027/06; B60R 19/205;
(Continued)

(56) References Cited

U.S. PATENT DOCUMENTS 6,926,329 B2* 8/2005 Neumann ........... B60R 11/0235
296/24.34
7,623,958 B1* 11/2009 Laverick ............. B60R 11/0258
361/679.01
(Continued)

FOREIGN PATENT DOCUMENTS

WO 2018111599 A1 6/2018

OTHER PUBLICATIONS

International Search Report and Written Opinion from the International Searching Authority for International Patent Application No. PCT/US2019/066569 dated Apr. 6, 2020 (in English) (14 Pages).

*Primary Examiner* — Kiran B Patel

(57) ABSTRACT

A vehicle interior component comprising a cover rotatably coupled to a base is disclosed. The component may comprise a mechanism comprising a feature on the base and a feature on the cover. When the cover is closed, the feature on the cover may axially align with the feature on the base. The feature on the base may disengage the feature on the cover when the cover opens and may engage the feature on the cover when the cover closes. The mechanism may comprise a cam mechanism comprising a cam surface and a follower. The mechanism may comprise a pivot joint. The pivot joint may comprise a set of projections to provide an axis of cover rotation. The pivot joint may comprise a projection and a ramp. The component may comprise a console, center stack/console, floor console, overhead console, instrument panel, door panel, etc.

19 Claims, 11 Drawing Sheets

Related U.S. Application Data

(60) Provisional application No. 62/781,353, filed on Dec. 18, 2018.

(58) Field of Classification Search
CPC ....... H01L 2924/00; H01L 2224/48091; H01L 2924/00014; H01L 2224/45144; G01R 1/0483
See application file for complete search history.

(56) References Cited

U.S. PATENT DOCUMENTS

| | | | | |
|---|---|---|---|---|
| 8,430,440 B1* | 4/2013 | Simon | ..................... | B60N 3/10 296/24.34 |
| 9,382,965 B2* | 7/2016 | Zhang | ..................... | F16F 9/54 |
| 2002/0163215 A1* | 11/2002 | Emerling | ............... | B60N 3/102 296/24.34 |
| 2004/0020935 A1* | 2/2004 | Inari | ........................ | B60R 7/06 220/830 |
| 2004/0066053 A1* | 4/2004 | Fero | ........................ | B60R 7/06 296/37.8 |
| 2005/0023089 A1* | 2/2005 | Okabayashi | ............... | E05F 5/06 188/82.2 |
| 2006/0054630 A1* | 3/2006 | Katagiri | .................... | B60R 7/06 220/830 |
| 2006/0208506 A1* | 9/2006 | Kern | .................... | E05C 19/022 292/304 |
| 2007/0013202 A1* | 1/2007 | Tompson | .................. | B60R 7/04 296/37.1 |
| 2008/0290681 A1* | 11/2008 | Takai | ...................... | B60R 7/082 296/37.7 |
| 2008/0290682 A1* | 11/2008 | Sauer | ........................ | B60R 7/06 296/37.12 |
| 2008/0315606 A1* | 12/2008 | Sturt | ...................... | B60N 3/102 296/24.34 |
| 2010/0050380 A1* | 3/2010 | Fujiwara | .................. | B60R 7/04 16/242 |
| 2010/0301625 A1 | 12/2010 | Lee | | |
| 2011/0121596 A1* | 5/2011 | Beyer | ........................ | B60R 7/04 296/24.34 |
| 2012/0001447 A1* | 1/2012 | Simon | ...................... | E05B 77/06 296/24.34 |
| 2012/0043778 A1* | 2/2012 | Brant | ........................ | B60R 7/04 296/24.34 |
| 2016/0221511 A1* | 8/2016 | Gofton | ...................... | B60R 7/04 |
| 2017/0015251 A1* | 1/2017 | Arendsen | ............... | B62D 65/14 |
| 2017/0036584 A1 | 2/2017 | Amick | | |
| 2017/0072862 A1* | 3/2017 | Arendsen | ................. | B60Q 3/51 |
| 2017/0313257 A1* | 11/2017 | Kang | ........................ | B60R 7/04 |
| 2017/0368998 A1* | 12/2017 | Arendsen | ................. | B60R 7/04 |
| 2018/0201172 A1* | 7/2018 | Faruque | .................. | B60R 7/04 |
| 2018/0370446 A1* | 12/2018 | Asselin | .................. | B60R 7/082 |
| 2019/0023188 A1* | 1/2019 | Grab | ........................ | B60R 7/04 |
| 2019/0315283 A1* | 10/2019 | Dresen-Rausch | ......... | B60R 7/10 |
| 2020/0173217 A1* | 6/2020 | Hodgson | .................. | B60R 7/06 |
| 2020/0408013 A1* | 12/2020 | Hodgson | .................. | E05C 3/12 |
| 2021/0053499 A1* | 2/2021 | Bogdanov | ............... | B60N 3/10 |

* cited by examiner

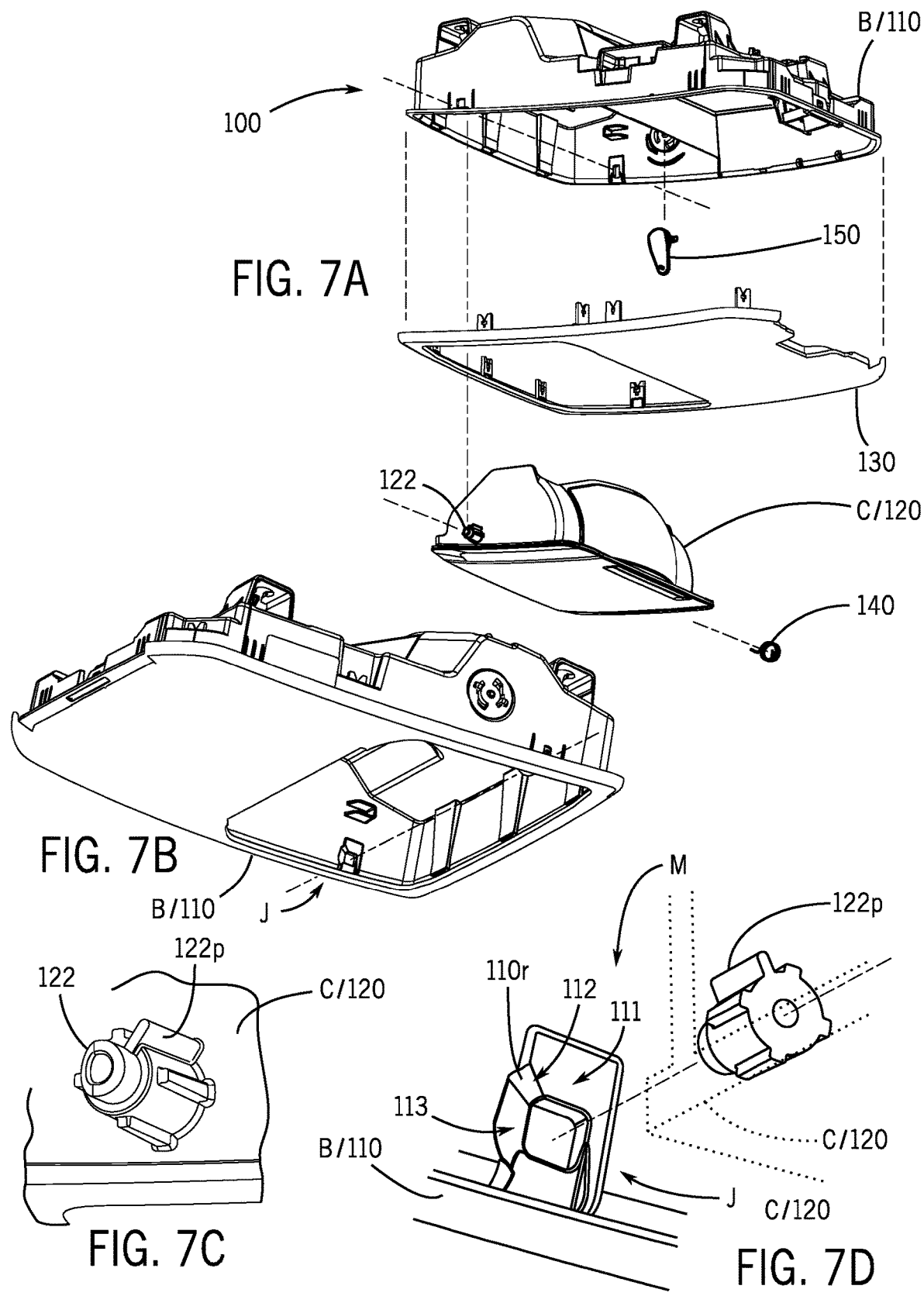

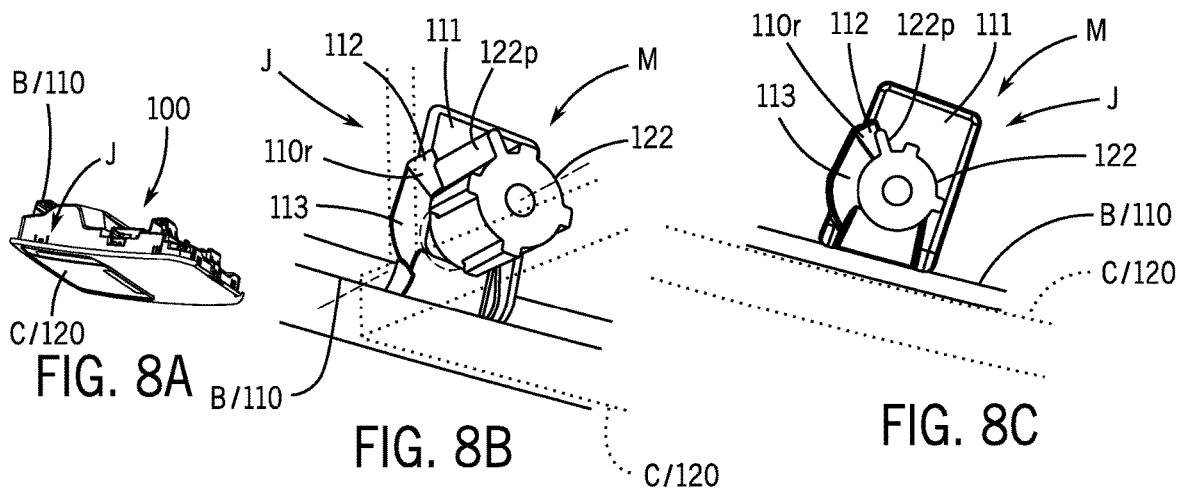
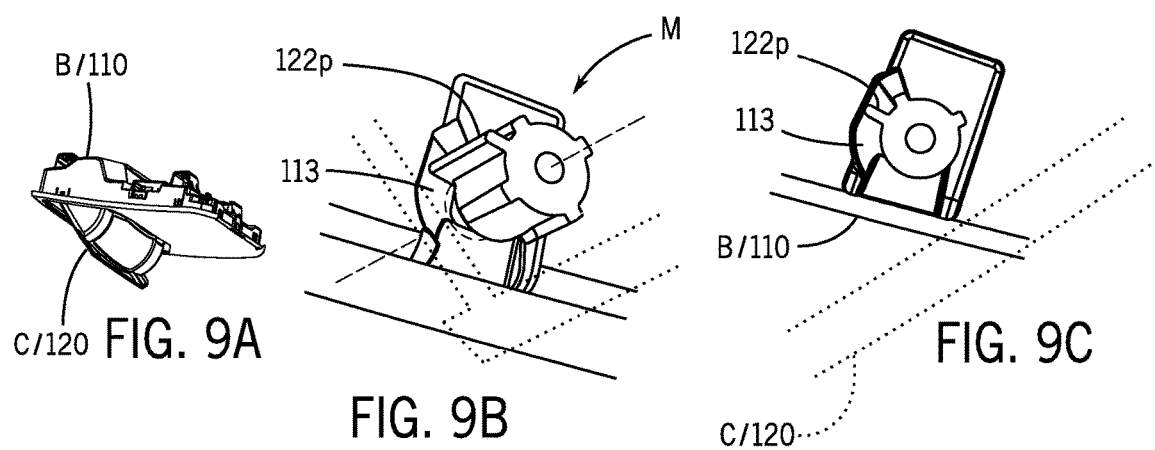
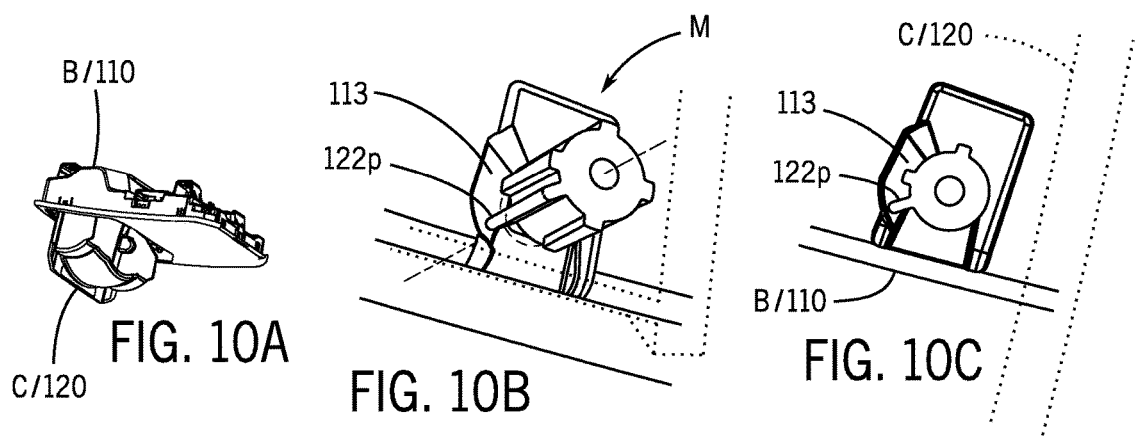

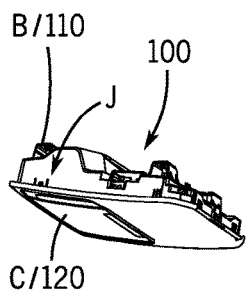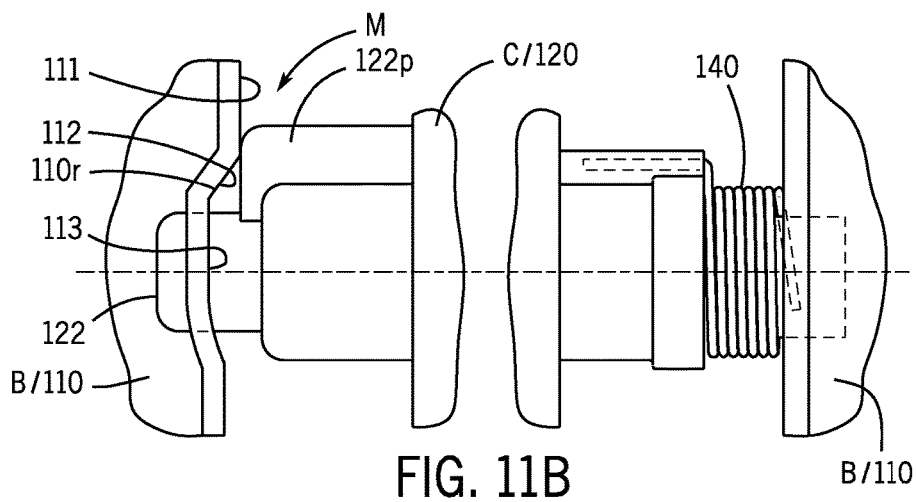
FIG. 11A  FIG. 11B
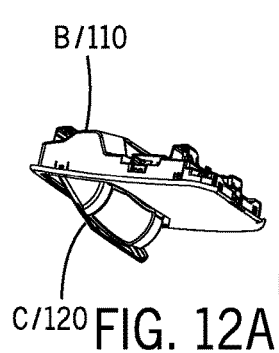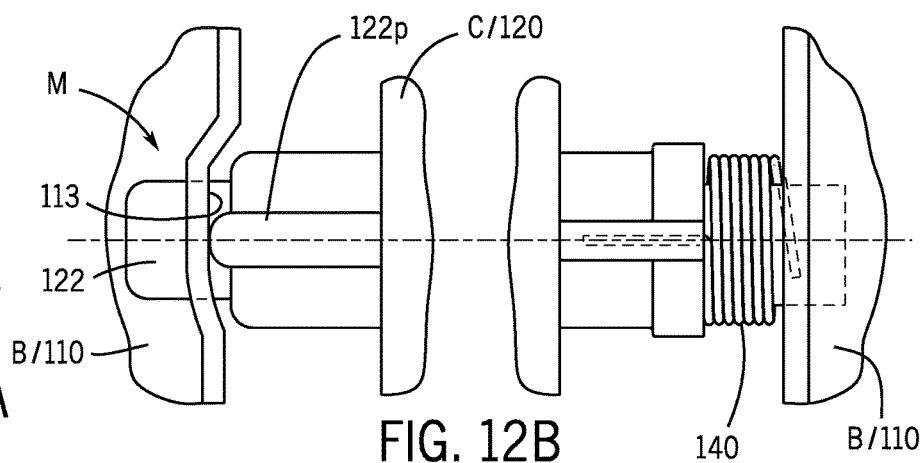
FIG. 12A  FIG. 12B
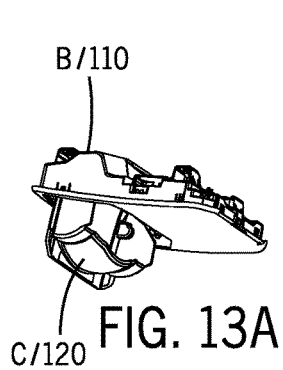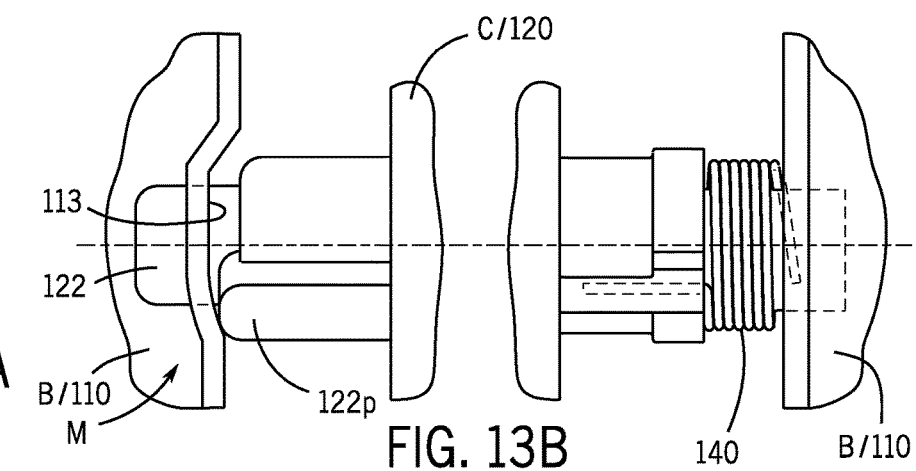
FIG. 13A  FIG. 13B

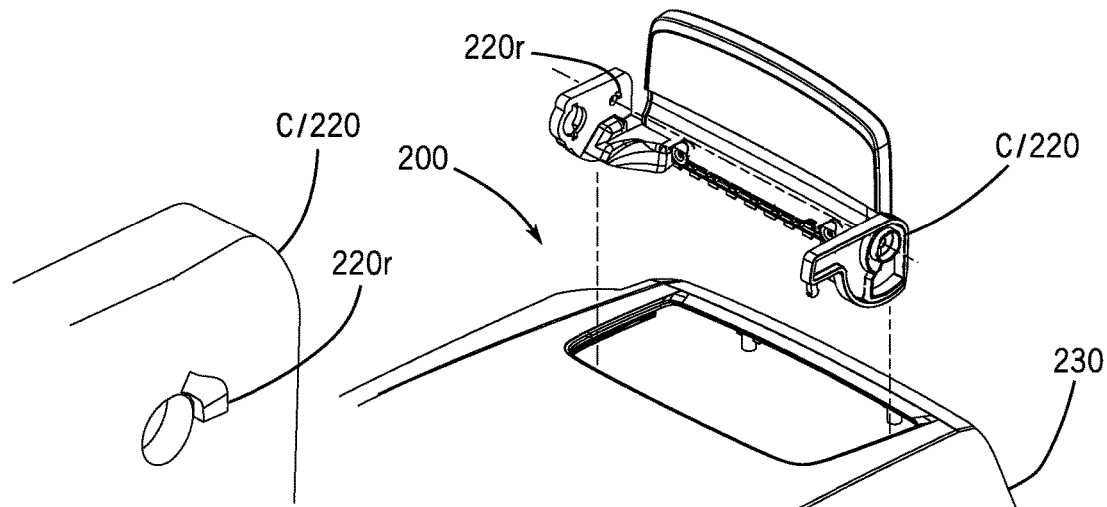
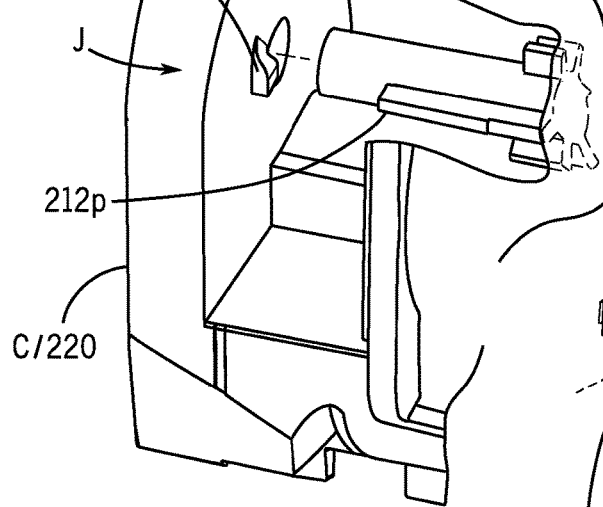
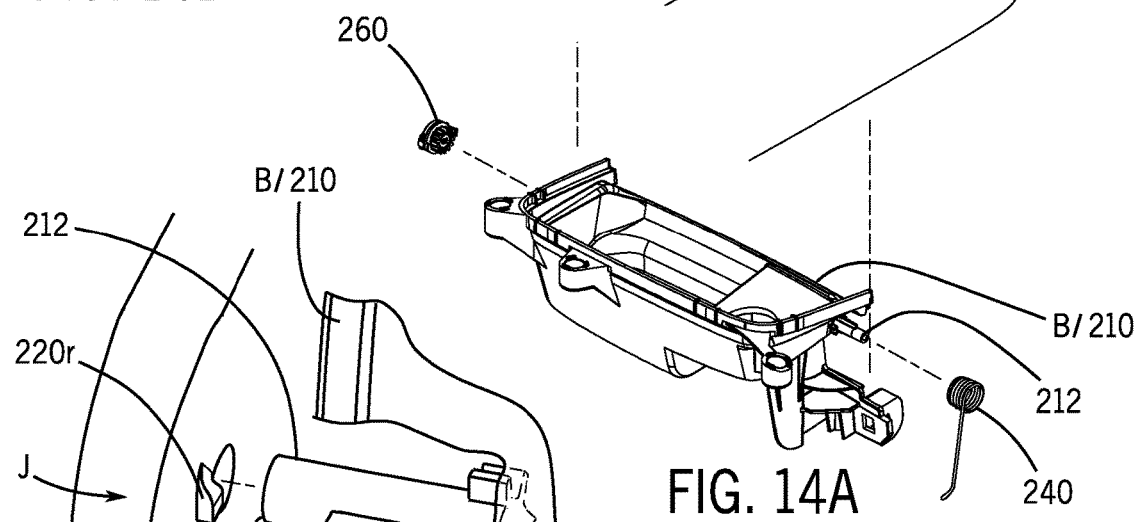
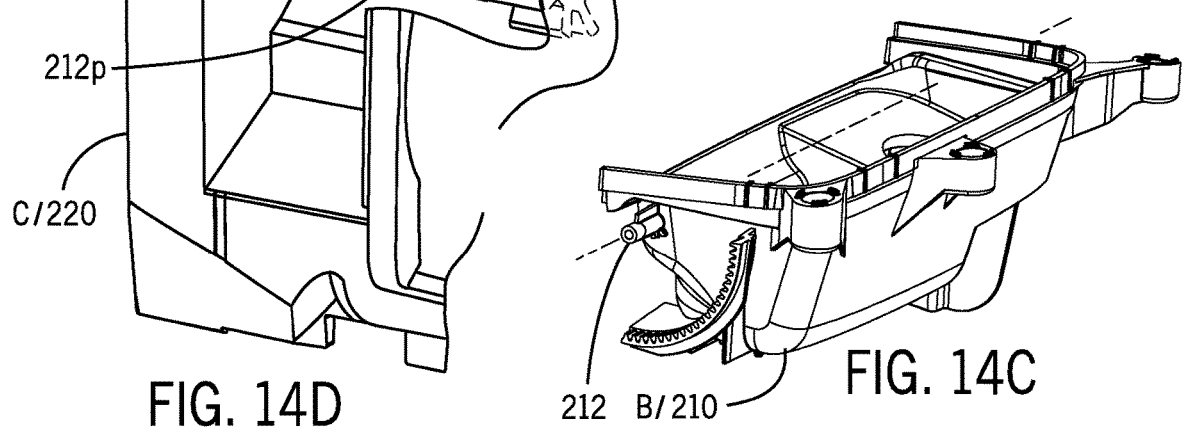

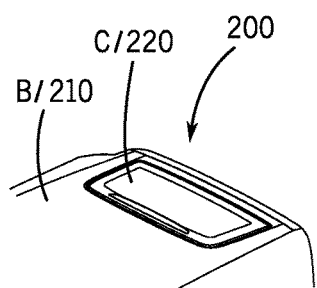
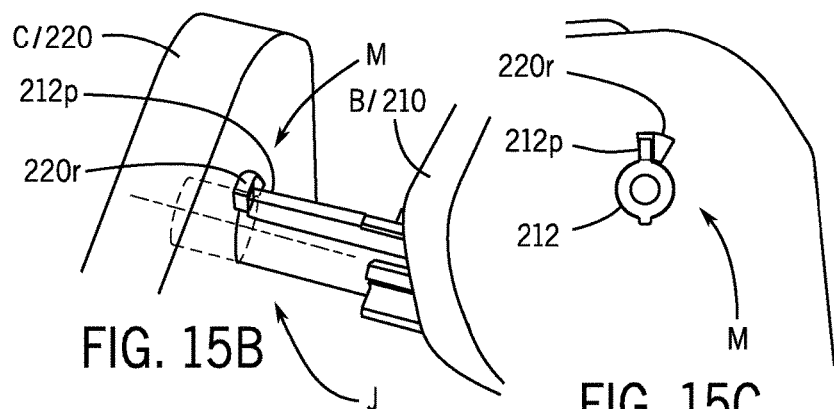
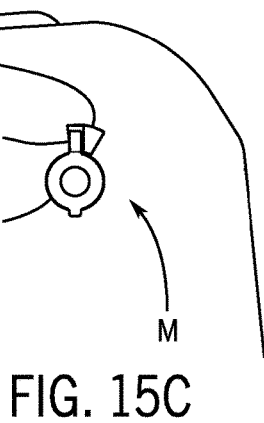
FIG. 15A  FIG. 15B  FIG. 15C
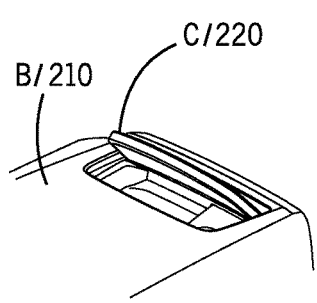
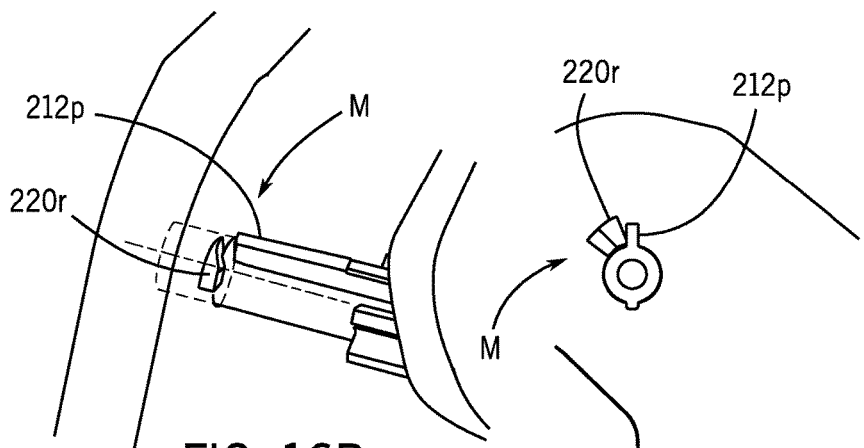
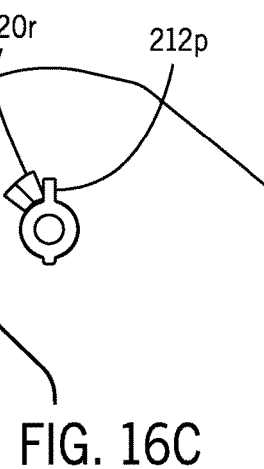
FIG. 16A  FIG. 16B  FIG. 16C
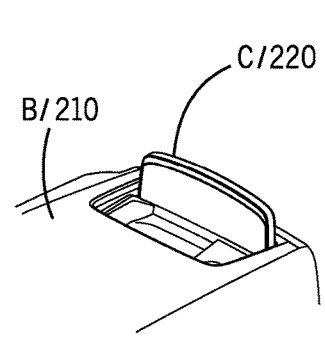
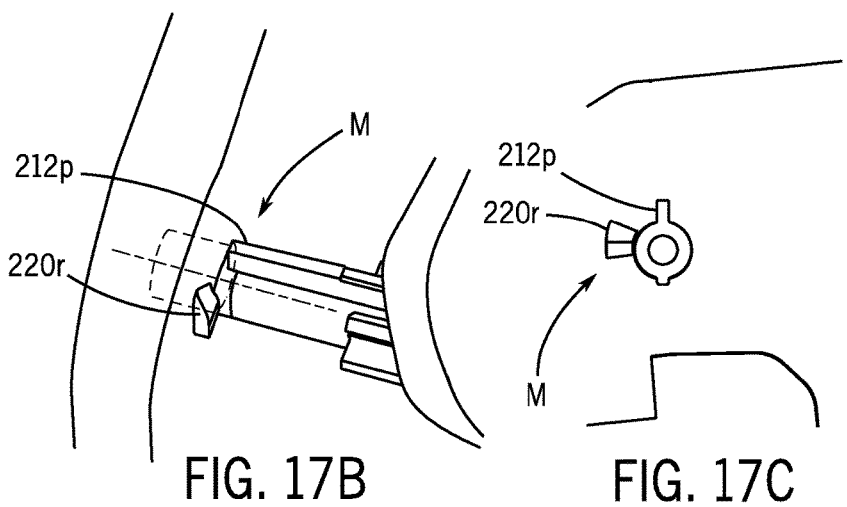
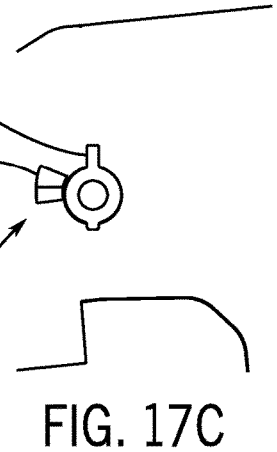
FIG. 17A  FIG. 17B  FIG. 17C

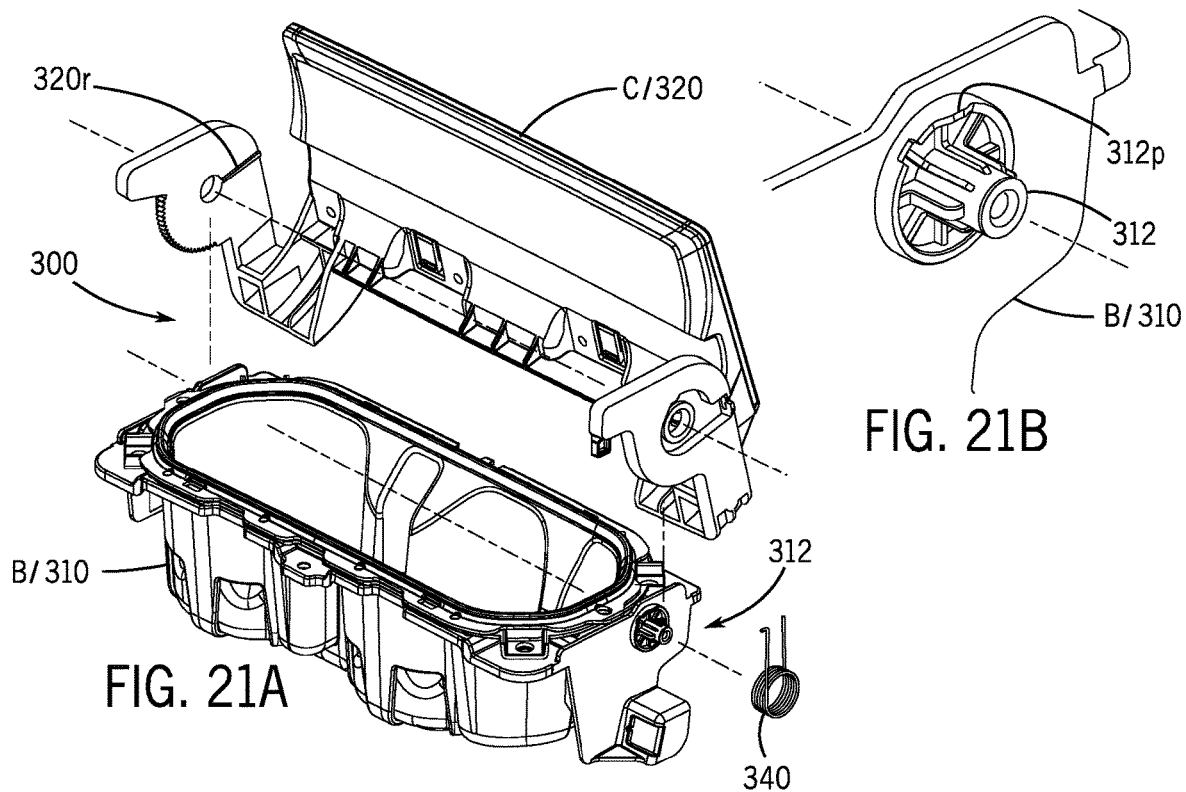
FIG. 21A
FIG. 21B
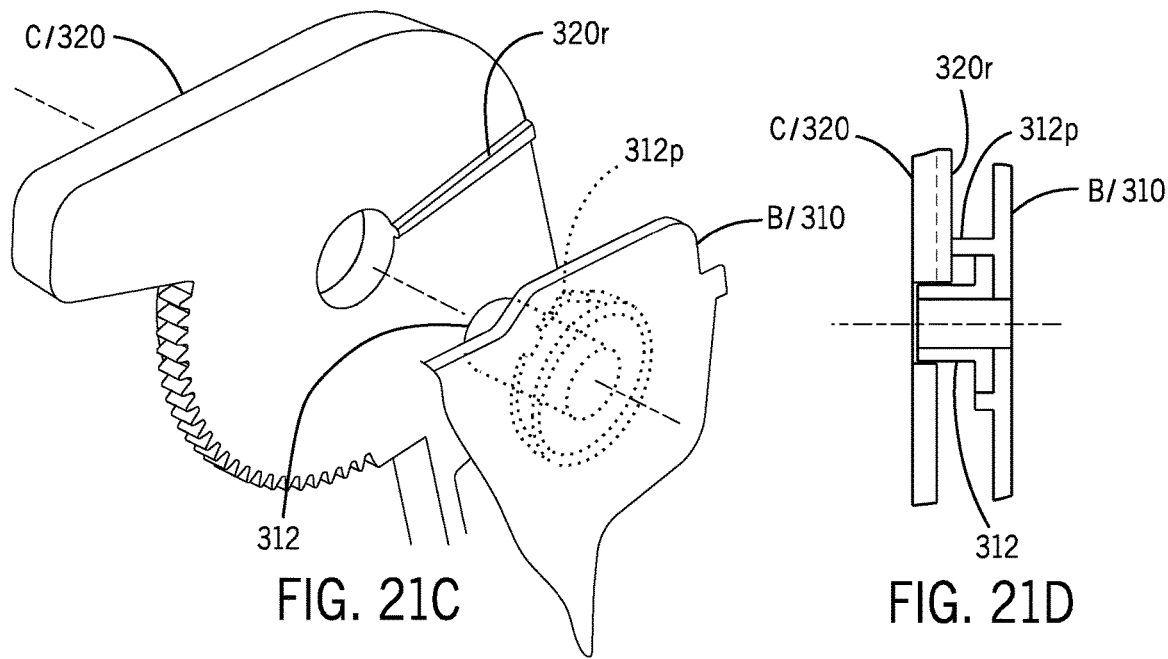
FIG. 21C
FIG. 21D

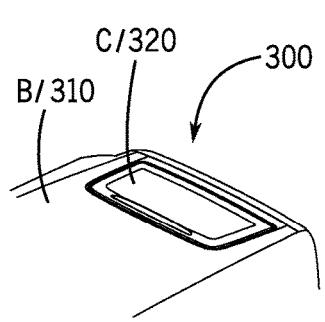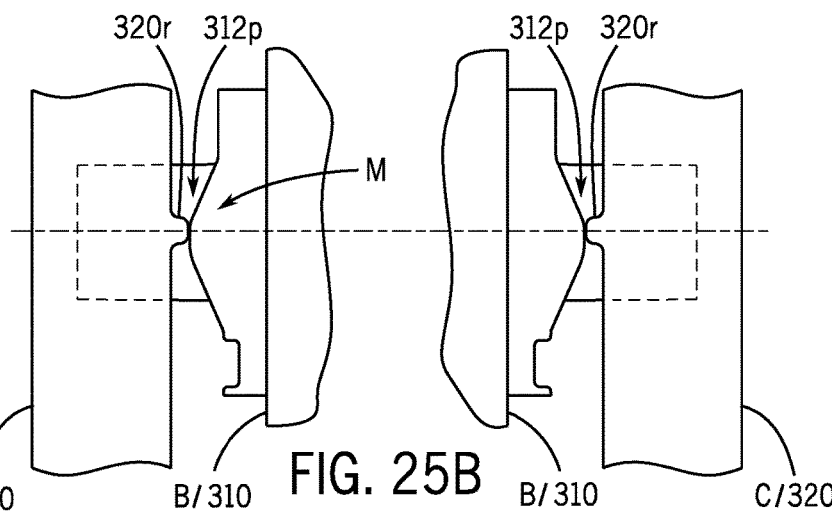
FIG. 25A
FIG. 25B
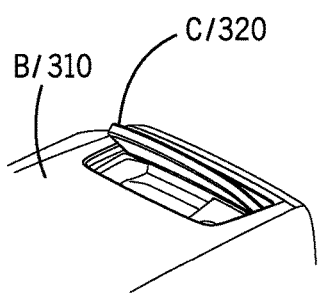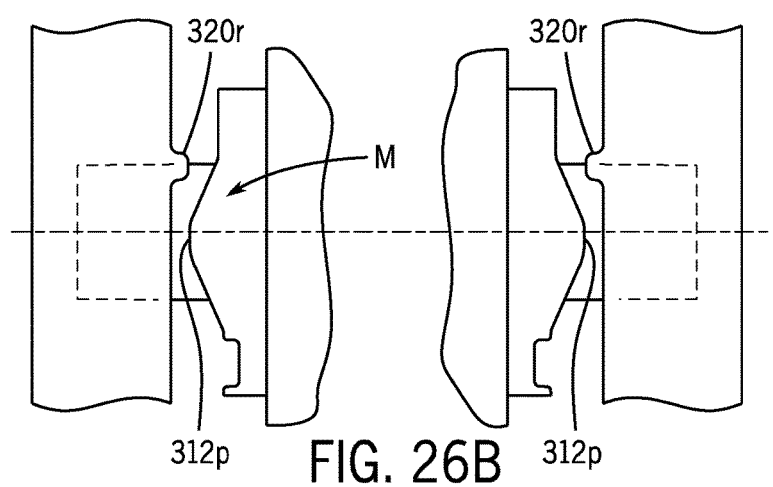
FIG. 26A
FIG. 26B
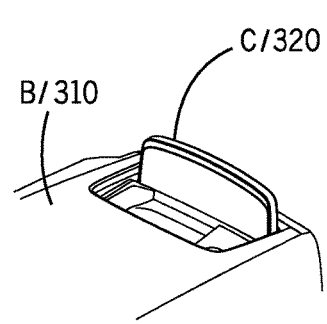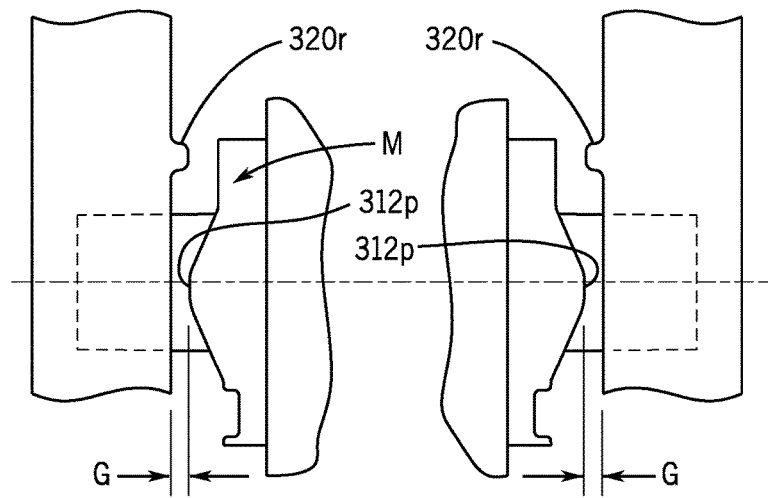
FIG. 27A
FIG. 27B

VEHICLE INTERIOR COMPONENT

CROSS-REFERENCE TO RELATED APPLICATIONS

The present application is a continuation of PCT/International Patent Application No. PCT/US2019/066569 titled "VEHICLE INTERIOR COMPONENT" filed Dec. 16, 2019, which claims the benefit of U.S. Provisional Patent Application No. 62/781,353 titled "VEHICLE INTERIOR COMPONENT" filed Dec. 18, 2018.

The present application claims priority to and incorporates by reference in full the following patent applications: (a) U.S. Provisional Patent Application No. 62/781,353 titled "VEHICLE INTERIOR COMPONENT" filed Dec. 18, 2018; (b) PCT/International Patent Application No. PCT/US2019/066569 titled "VEHICLE INTERIOR COMPONENT" filed Dec. 16, 2019.

FIELD

The present invention relates to a vehicle interior component.

BACKGROUND

It is known to provide a component for a vehicle interior comprising a base and a cover configured to be installed to the base and configured for movement relative to the base at a joint between a closed position and an open position. For example, an overhead console in a vehicle may include a retractable storage compartment suitable for storing sunglasses; a floor console in a vehicle may include a storage compartment with a cover or door suitable for storing objects.

It would be advantageous to provide an improved vehicle interior component configured to provide a storage compartment. It would also be advantageous to provide an improved vehicle interior component with an improved joint/mechanism coupling the cover to the base. It would further be advantageous to provide an improved vehicle interior component configured to couple the cover to the base to maintain a consistent fit and/or to facilitate ease of opening of the cover from the base for access to the storage compartment.

SUMMARY

The present invention relates to a vehicle interior component comprising a base; a cover coupled to the base; and a mechanism comprising a feature on the base and a feature on the cover. The cover may be configured to be rotated between a closed position and an open position relative to the base. The mechanism may be configured so that when the cover is in the closed position the feature on the cover is in axial alignment with the feature on the base. The mechanism may be configured so that the feature on the base disengages the feature on the cover when the cover is rotated from the closed position toward the open position. The mechanism may be configured so that the feature on the base engages the feature on the cover when the cover is rotated from the open position to the closed position. The mechanism may comprise a cam mechanism; the cam mechanism may comprise a cam surface and a follower. The cam mechanism may be configured so that the follower engages the cam surface when the cover is rotated between the closed position and the open position. The base may comprise the cam surface; the cover may comprise the follower; the cam mechanism may be configured so that the follower on the cover disengages the cam surface on the base when the cover is rotated between the closed position and the open position. The cover may comprise the cam surface; the base may comprise the follower. The mechanism may comprise a pivot joint; the pivot joint may comprise a projection configured to operate in axial alignment with a ramp. The component may comprise at least one of (a) a console; (b) a floor console, (c) a center console, (d) an overhead console, (e) a center stack, (f) an instrument panel, (g) a door.

The present invention relates to a vehicle interior component comprising a base; a cover coupled to the base; and a mechanism comprising a feature on the base and a feature on the cover. The cover may be configured to be rotated between a closed position and an open position relative to the base. The mechanism may be configured so that when the cover is in the closed position the feature on the cover is in axial alignment with the feature on the base. The mechanism may comprise a pivot joint; the pivot joint may comprise a set of projections to provide an axis of rotation for the cover. The pivot joint may comprise the feature on the cover and the feature on the base. The pivot joint may comprise a projection and a ramp. One of the projection and the ramp may be configured to slide along the other of the projection and the ramp as the cover moves between the closed position and the open position. The component may comprise a gap between the projection and the ramp when the cover is in the open position. At least one of (a) the base; (b) the cover may be configured to flex at the pivot joint as the cover moves from the closed position toward the open position.

The present invention relates to a vehicle interior component comprising a base; a cover coupled to the base; and a mechanism comprising a feature on the base and a feature on the cover. The cover may be configured to be rotated between a closed position and an open position relative to the base. The mechanism may be configured so that when the cover is in the closed position the feature on the cover is in axial alignment with the feature on the base. The base may comprise an opening having a perimeter; the cover may comprise a perimeter; when the cover is in the closed position the perimeter of the cover may be configured for a fit within the perimeter of the opening of the base. The mechanism may comprise an axis of rotation of the cover relative to the base; the fit of the perimeter of the cover within the perimeter of the opening of the base may be established adjacent to the axis; the fit may comprise a space between the perimeter of the cover and the perimeter of the opening of the base. The mechanism may be configured to establish the fit of the cover within the opening of the base. The mechanism may be configured to maintain the space between the perimeter of the cover and the perimeter of the opening of the base. The mechanism may be configured so that the feature on the cover maintains engagement with the feature on the base when the cover is moved from the closed position to the open position. The mechanism may comprise a joint; the joint may comprise at least one of (a) a shaft; (b) a pivot pin. The joint may comprise a set of projections to provide an axis of rotation.

The present invention relates to a vehicle interior component comprising a base comprising a feature and a cover comprising a feature. The cover may be configured to be rotated between a closed position and an open position relative to the base; the cover may be configured so that when the cover is in the closed position the feature of the base is in contact with the feature of the cover. The cover may comprise a perimeter; the base may comprise an opening comprising a perimeter; when the cover is in the closed position the perimeter of the opening of the base may be configured to provide a fit for the perimeter of the cover. The fit may comprise a fixed dimension within the base. The fit may comprise a flexible dimension for the cover. The cover may be configured to be rotated about an axis; when the cover is in the closed position a fit of the perimeter of the cover within the perimeter of the opening of the base may be established adjacent to the axis; the fit may comprise a space between the perimeter of the cover and the perimeter of the opening of the base. The fit may be determined adjacent to the axis. The base may comprise a pair of walls; the feature of the base may comprise a feature on each wall of the pair of walls; the fit may comprise a distance between the pair of walls of the base. The cover may comprise a pair of arms; the feature of the cover may comprise a feature on each arm of the pair of arms. The fit may be determined at least partially by a distance between the pair of arms of the cover when the cover is in the closed position. The distance may be determined along an axis of rotation of the cover. When the cover is moved to the open position a gap may be provided between the feature of the cover and the feature of the base. The feature of the cover may comprise a protrusion. The component may further comprise a mechanism comprising the feature of the base and the feature of the cover. The mechanism may comprise a joint; the joint may be configured to establish a fit of the cover within an opening of the base. The joint may be configured so that a required applied force to move the cover between the closed position and the open position is variable as the cover moves from the closed position toward the open position. The cover may comprise a pair of flexible arms; each arm may comprise the feature of the cover; the base may comprise a pair of sidewalls; each sidewall of the pair of sidewalls may comprise the feature of the base. Each arm of the cover may comprise a protrusion. Each sidewall of the base may comprise a flexible sidewall; the sidewalls may provide a clamp force on the protrusion; the cover may be installed within the sidewalls of the base; each arm of the cover may rotate either (a) within the sidewalls of the base or (b) outside of the sidewalls of the base. The component may further comprise a cam mechanism comprising the feature of the base and the feature of the cover. The cover may be configured so that when the cover is moved toward the open position the feature of the cover is separated from the base. The cover may be configured so that when the cover is moved toward the open position the feature of the base is separated from the cover. When the cover is in the closed position the feature of the cover may be in axial alignment with the feature of the base. The feature of the base may be disengaged from the feature of the cover when the cover is rotated from the closed position to the open position so that a required opening force for the cover is reduced.

The present invention relates to a vehicle interior component comprising a base; a cover coupled to the base; a mechanism comprising a feature on the base and a feature on the cover. The cover may be configured to be rotated between a closed position and an open position relative to the base; the mechanism may be configured so that when the cover is in the closed position the feature on the cover is in axial alignment with the feature on the base. The mechanism may be configured so that the feature on the base engages the feature on the cover when the cover is rotated from the open position to the closed position. The mechanism may be configured so that the feature on the base disengages the feature on the cover when the cover is rotated from the closed position toward the open position. The mechanism may comprise a cam mechanism; the feature on the base may comprise a surface; the feature on the base may comprise a follower. The mechanism may comprise a cam mechanism; the cam mechanism may comprise a cam surface and a follower configured to engage the cam surface. The feature on the base may comprise the cam surface; the feature on the base may comprise the follower. The mechanism may be configured to facilitate movement of the cover to the open position. The mechanism may comprise a pivot joint; the pivot joint may comprise a set of projections to provide an axis of rotation for the cover. The pivot joint may comprise the feature on the cover and the feature on the base. The base may comprise an opening having a perimeter; the cover may comprise a perimeter; when the cover is in the closed position the perimeter of the cover may be configured for a fit within the perimeter of the opening of the base. The mechanism may be configured to establish the fit of the cover within the opening of the base. The mechanism may comprise an axis of rotation of the cover relative to the base. The fit of the perimeter of the cover within the perimeter of the opening of the base may be established adjacent to the axis; the fit may comprise a space between the perimeter of the cover and the perimeter of the opening of the base. The mechanism may be configured to maintain the space between the perimeter of the cover and the perimeter of the opening of the base. The mechanism may be configured so that the feature on the cover maintains engagement with the feature on the base when the cover is moved from the closed position to the open position. The mechanism may comprise a spring; the spring may be configured to facilitate rotation of the cover relative to the base. The mechanism may comprise a joint; the joint may comprise at least one shaft. The at least one shaft may comprise a pivot pin. The joint may comprise a set of projections to provide an axis of rotation.

The present invention relates to a vehicle interior component comprising a base; a cover coupled to the base; a cam mechanism comprising a cam surface and a follower. The cover may be configured to be rotated between a closed position and an open position relative to the base; the cam mechanism may be configured so that the follower engages the cam surface when the cover is rotated between the closed position and the open position. The base may comprise the cam surface; the cover may comprise the follower. The cam mechanism may be configured so that the follower on the cover disengages the cam surface on the base when the cover is rotated between the closed position and the open position. The cover may comprise the cam surface; the base may comprise the follower. The cam mechanism may comprise an axis of rotation of the cover relative to the base. The base may comprise an opening having a perimeter; the cover may comprise a perimeter; when the cover is in the closed position the perimeter of the cover may be configured for a fit within the perimeter of the opening of the base. The cover may be configured to rotate about an axis between the closed position and the open position relative to the opening of the base. When the cover is in the closed position the perimeter of the cover may be configured for the fit within the perimeter of the opening of the base; the fit of the perimeter of the cover within the perimeter of the opening of the base may be established adjacent to the axis; the fit may comprise a space between the perimeter of the cover and the perimeter of the opening of the base. The cam mechanism may be configured to establish the fit of the cover within the opening of the base. The cam mechanism may be configured to maintain the space between the perimeter of the cover and the perimeter of the opening of the base.

The present invention relates to a component for a vehicle interior comprising a base and a cover configured to be installed to the base and for movement relative to the base at a joint between a closed position and an open position. The joint may comprise a projection and a ramp; one of the projection and the ramp may be configured to slide along the other of the projection and the ramp as the cover moves between the closed position and the open position. The ramp may comprise at least one of (a) a cam; (b) an incline. The component may further comprise a gap between the projection and the ramp when the cover is in the open position. The joint may comprise a pivot joint; movement may comprise rotation. The cover may comprise at least one of (a) a door; (b) a bin; (c) a sunglass bin. The component may comprise at least one of (a) a console; (b) a floor console, (c) a center console, (d) an overhead console, (e) a center stack, (f) an instrument panel, (g) a door.

The present invention relates to a component for a vehicle interior comprising a base and a cover configured to be installed to the base and for movement relative to the base at a joint between a closed position and an open position. At least one of (a) the base; (b) the cover may be configured to flex at the joint as the cover moves from the closed position toward the open position.

The present invention relates to a component for a vehicle interior comprising a base and a cover configured to be installed to the base and for movement relative to the base at a joint between a closed position and an open position. The joint may comprise a projection, a first surface and a second surface; the projection may be configured to engage the first surface when the cover is in the closed position; the projection may be configured to engage the second surface when the cover is in the open position.

The present invention relates to a vehicle interior component comprising: a base providing an opening having a perimeter; a cover having a perimeter; a joint coupling the cover to the base. The cover may be configured to rotate about an axis between a closed position and an open position relative to the opening of the base. When the cover is in the closed position the perimeter of the cover may be configured for a fit within the perimeter of the opening of the base. The joint may be configured to establish the fit of the cover within the opening of the base. The joint may be configured so that a required applied force to move the cover between the closed position and the open position is variable as the cover rotates from the closed position toward the open position. The fit of the perimeter of the cover within the perimeter of the opening of the base adjacent to the axis may comprise a space between the perimeter of the cover and the perimeter of the opening of the base. The joint may be configured to maintain the space between the perimeter of the cover and the perimeter of the opening of the base. The joint may comprise a set of projections to provide an axis. The joint may comprise a feature on the cover and a feature on the base. The cover may comprise at least one feature comprising a cam surface. The base may comprise at least one feature comprising a cam surface. The base may comprise a feature comprising a follower. The joint may comprise a mechanism comprising a feature on the cover and a feature on the base. The mechanism may be configured so that the feature on the cover engages the feature on the base when the cover is moved to the closed position. The mechanism may be configured so that the feature on the cover disengages from the feature on the base when the cover is moved from the closed position to the open position. When the feature on the cover disengages from the feature on the base the feature on the cover may be separated from the feature on the base. The mechanism may be configured to facilitate movement of the cover by reducing the required applied force during movement of the cover from the closed position toward the open position. Engagement of the feature on the base with the feature on the cover may establish the space of the fit between the perimeter of the cover and the perimeter of the opening of the base.

The present invention relates to a component for a vehicle interior comprising a base and a cover configured to be installed to the base and configured for movement relative to the base at a joint between a closed position and an open position. The joint may comprise a projection and a ramp. One of the projection and the ramp may be configured to slide along the other of the projection and the ramp as the cover moves between the closed position and the open position. The ramp may comprise at least one of (a) a cam; (b) an incline. The component may comprise a gap between the projection and the ramp when the cover is in the open position. The joint may comprise a pivot joint; movement may comprise rotation. The cover may comprise at least one of (a) a door; (b) a bin; (c) a sunglass bin. The component may comprise at least one of (a) a console; (b) a floor console, (c) a center console, (d) an overhead console, (e) a center stack, (f) an instrument panel, (g) a door.

The present invention relates to a component for a vehicle interior comprising a base, a cover configured to be installed to the base and configured for movement relative to the base at a joint between a closed position and an open position. At least one of (a) the base; (b) the cover may be configured to flex at the joint as the cover moves from the closed position toward the open position.

The present invention relates to a component for a vehicle interior comprising a base, a cover configured to be installed to the base and configured for movement relative to the base at a joint between a closed position and an open position. The joint may comprise a projection, a first surface and a second surface. The projection may be configured to engage the first surface when the cover is in the closed position. The projection may be configured to engage the second surface when the cover is in the open position.

FIGURES

FIG. 7A is a schematic exploded perspective view of a vehicle interior component according to an exemplary embodiment.

FIG. 7B is a partial schematic perspective view of a vehicle interior component according to an exemplary embodiment.

FIG. 7C is a partial schematic perspective view of a vehicle interior component according to an exemplary embodiment.

FIG. 7D is a partial schematic perspective view of a vehicle interior component according to an exemplary embodiment.

FIG. 8A is a schematic perspective view of a vehicle interior component according to an exemplary embodiment.

FIG. 8B is a schematic partial perspective view of a vehicle interior component according to an exemplary embodiment.

FIG. 8C is a schematic partial side view of a vehicle interior component according to an exemplary embodiment.

FIG. 9A is a schematic perspective view of a vehicle interior component according to an exemplary embodiment.

FIG. 9B is a schematic partial perspective view of a vehicle interior component according to an exemplary embodiment.

FIG. 9C is a schematic partial side view of a vehicle interior component according to an exemplary embodiment.

FIG. 10A is a schematic perspective view of a vehicle interior component according to an exemplary embodiment.

FIG. 10B is a schematic partial perspective view of a vehicle interior component according to an exemplary embodiment.

FIG. 10C is a schematic partial side view of a vehicle interior component according to an exemplary embodiment.

FIG. 11A is a schematic perspective view of a vehicle interior component according to an exemplary embodiment.

FIG. 11B is a schematic partial section view of a vehicle interior component according to an exemplary embodiment.

FIG. 12A is a schematic perspective view of a vehicle interior component according to an exemplary embodiment.

FIG. 12B is a schematic partial section view of a vehicle interior component according to an exemplary embodiment.

FIG. 13A is a schematic perspective view of a vehicle interior component according to an exemplary embodiment.

FIG. 13B is a schematic partial section view of a vehicle interior component according to an exemplary embodiment.

FIG. 14A is a schematic partial exploded perspective view of a vehicle interior component according to an exemplary embodiment.

FIG. 14B is a partial schematic perspective view of a vehicle interior component according to an exemplary embodiment.

FIG. 14C is a partial schematic perspective view of a vehicle interior component according to an exemplary embodiment.

FIG. 14D is a partial schematic perspective view of a vehicle interior component according to an exemplary embodiment.

FIG. 15A is a schematic perspective view of a vehicle interior component according to an exemplary embodiment.

FIG. 15B is a schematic partial perspective view of a vehicle interior component according to an exemplary embodiment.

FIG. 15C is a schematic partial side view of a vehicle interior component according to an exemplary embodiment.

FIG. 16A is a schematic perspective view of a vehicle interior component according to an exemplary embodiment.

FIG. 16B is a schematic partial perspective view of a vehicle interior component according to an exemplary embodiment.

FIG. 16C is a schematic partial side view of a vehicle interior component according to an exemplary embodiment.

FIG. 17A is a schematic perspective view of a vehicle interior component according to an exemplary embodiment.

FIG. 17B is a schematic partial perspective view of a vehicle interior component according to an exemplary embodiment.

FIG. 17C is a schematic partial side view of a vehicle interior component according to an exemplary embodiment.

FIG. 21A is a schematic partial exploded perspective view of a vehicle interior component according to an exemplary embodiment.

FIG. 21B is a partial schematic perspective view of a vehicle interior component according to an exemplary embodiment.

FIG. 21C is a partial schematic exploded perspective view of a vehicle interior component according to an exemplary embodiment.

FIG. 21D is a partial cross-section view of a vehicle interior component according to an exemplary embodiment.

FIG. 25A is a schematic perspective view of a vehicle interior component according to an exemplary embodiment.

FIG. 25B is a schematic partial section view of a vehicle interior component according to an exemplary embodiment.

FIG. 26A is a schematic perspective view of a vehicle interior component according to an exemplary embodiment.

FIG. 26B is a schematic partial section view of a vehicle interior component according to an exemplary embodiment.

FIG. 27A is a schematic perspective view of a vehicle interior component according to an exemplary embodiment.

FIG. 27B is a schematic partial section view of a vehicle interior component according to an exemplary embodiment.

DESCRIPTION

Figure 1A:
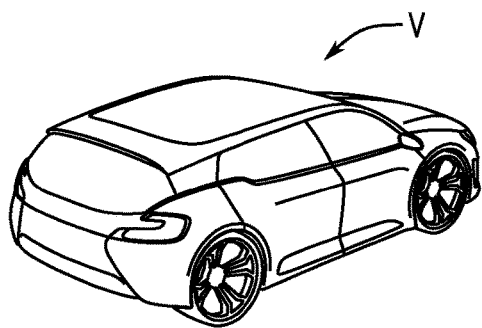
FIG. 1A is a schematic perspective view of a vehicle according to an exemplary embodiment.
Figure 1B:
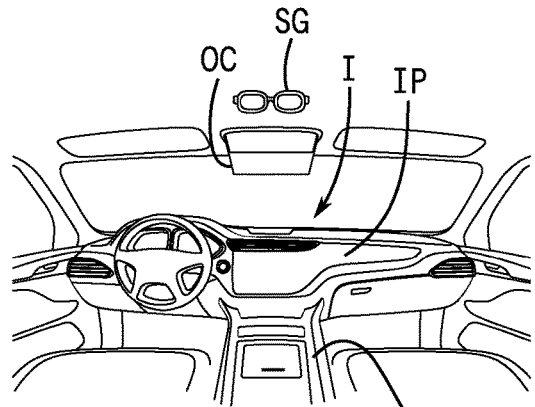
FIG. 1B is a schematic perspective rear view of a vehicle interior according to an exemplary embodiment.

According to an exemplary embodiment as shown schematically in FIGS. 1A and 1B, a vehicle V may comprise an interior I providing an instrument panel IP, an overhead console OC configured to receive and stow articles such as sunglasses SG (e.g. within a compartment) and a floor console FC configured to receive and stow articles (e.g. within a compartment).

Figure 2A:
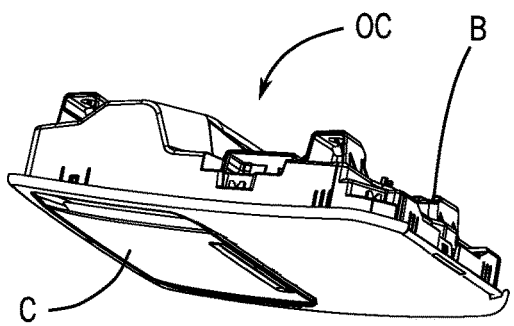
FIGS. 2A-2C are schematic partial perspective views of a vehicle interior component according to an exemplary embodiment.
Figure 2B:
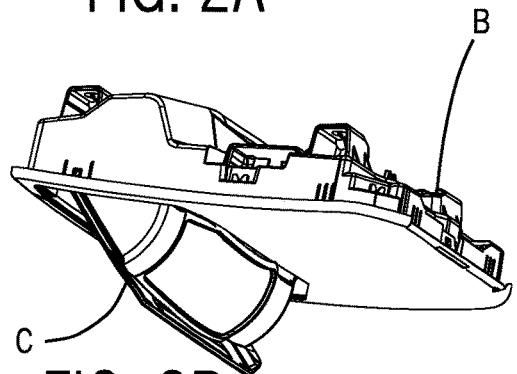
Figure 2C:
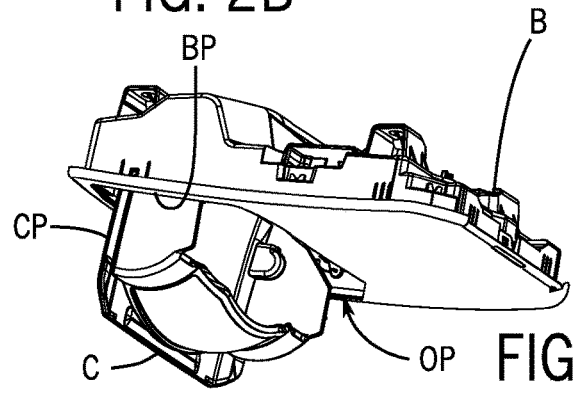

According to an exemplary embodiment as shown schematically in FIGS. 2A-2C, overhead console OC may comprise a base B and a cover C configured to be installed to base B and configured for movement relative to base B between a closed position (see FIG. 2A) and an open position (see FIG. 2C). See also FIG. 2B (intermediate position between closed position and open position).

Figure 3A:
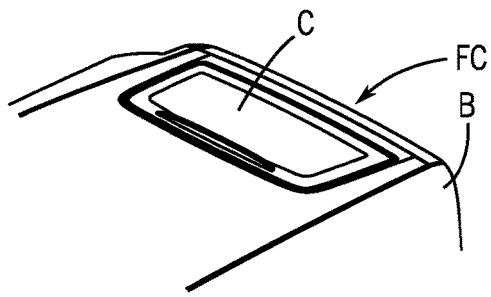
FIGS. 3A-3C are schematic partial perspective views of a vehicle interior component according to an exemplary embodiment.
Figure 3B:
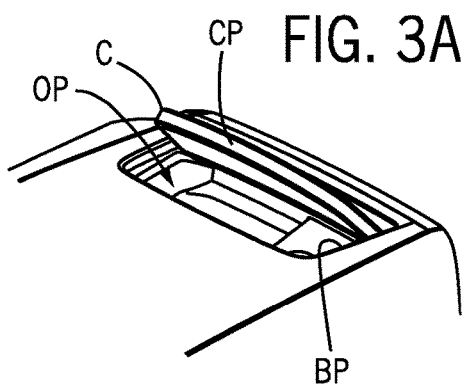
Figure 3C:
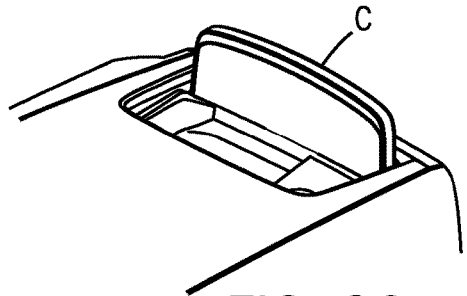

According to an exemplary embodiment as shown schematically in FIGS. 3A-3C, floor console FC may comprise a base B and a cover C configured to be installed to base B and configured for movement relative to base B between a closed position (see FIG. 3A) and an open position (see FIG. 3C). See also FIG. 3B (intermediate position between closed position and open position).

Figure 4A:
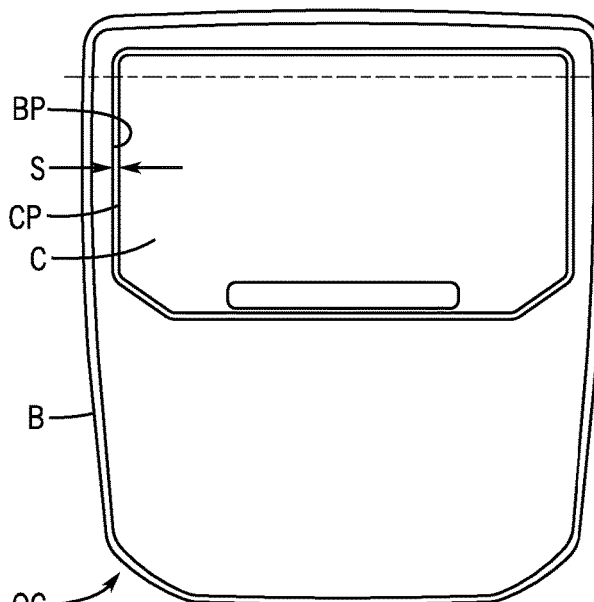
FIG. 4A is a schematic plan view of a vehicle interior component according to an exemplary embodiment.
Figure 5A:
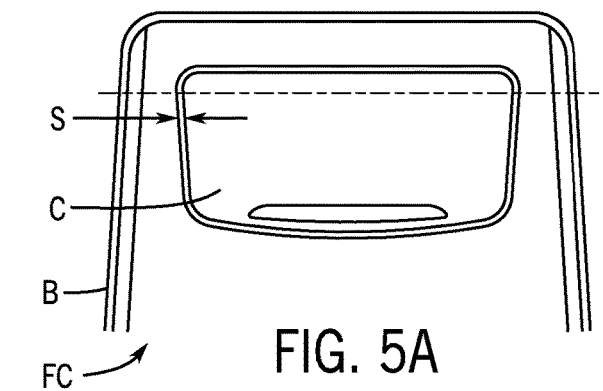
FIG. 5A is a schematic plan view of a vehicle interior component according to an exemplary embodiment.
Figure 6A:
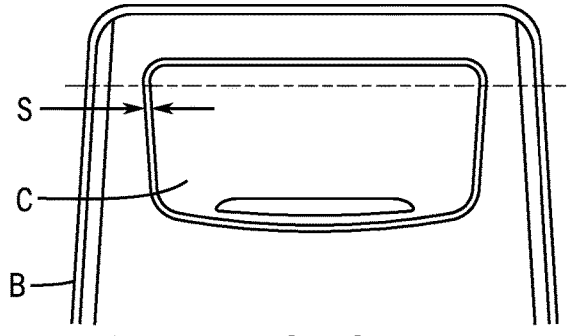
FIG. 6A is a schematic plan view of a vehicle interior component according to an exemplary embodiment.

As indicated schematically in FIGS. 2A-2C and 3A-3C, the component may comprise base B configured to provide an opening OP providing a perimeter BP and cover C configured to provide a perimeter CP. See also FIGS. 4A, 5A and 6A (exemplary embodiment of component shown as overhead console OC and floor console FC). According to an exemplary embodiment shown schematically, perimeter CP for cover C is configured to fit (with a space S) within perimeter BP for opening OP of base B when cover C is closed with base B (e.g. in the closed position). See e.g. FIGS. 2A, 3A, 4A, 5A and 6A.

Figure 4B:
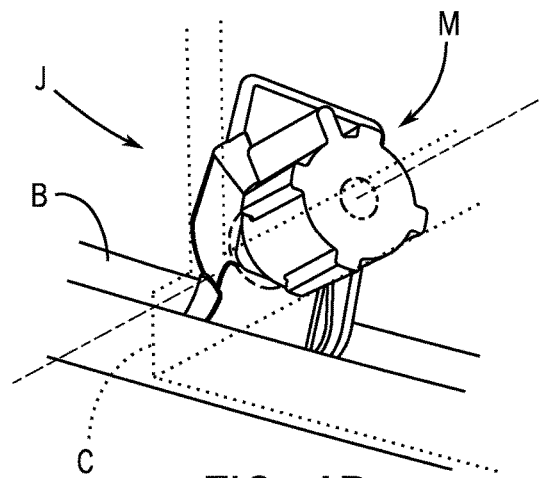
FIG. 4B is a partial schematic perspective view of a vehicle interior component according to an exemplary embodiment.
Figure 5B:
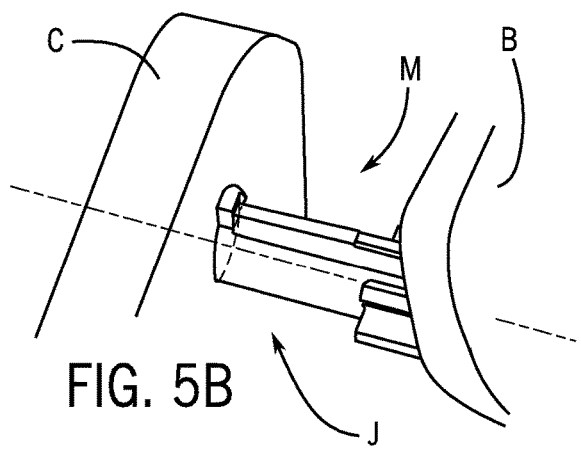
FIG. 5B is a partial schematic perspective view of a vehicle interior component according to an exemplary embodiment.
Figure 6B:
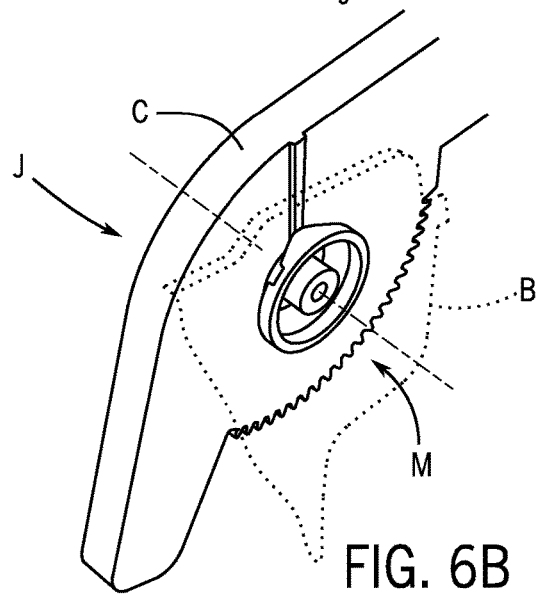
FIG. 6B is a partial schematic perspective view of a vehicle interior component according to an exemplary embodiment.
Figure 18A:
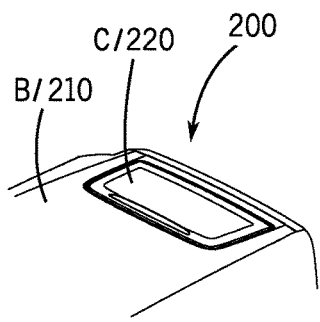
FIG. 18A is a schematic perspective view of a vehicle interior component according to an exemplary embodiment.
Figure 18B:
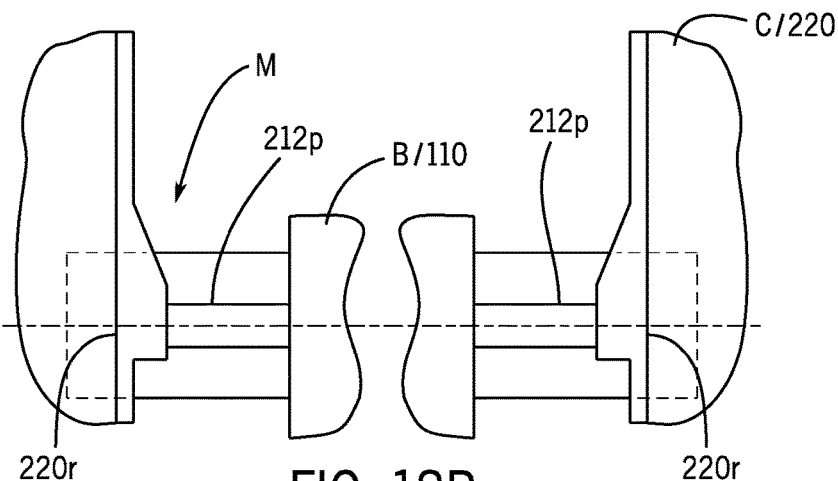
FIG. 18B is a schematic partial section view of a vehicle interior component according to an exemplary embodiment.
Figure 19A:
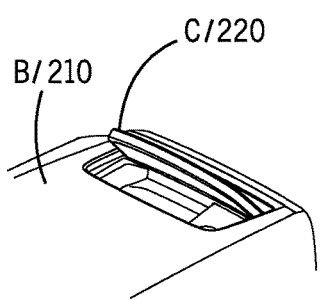
FIG. 19A is a schematic perspective view of a vehicle interior component according to an exemplary embodiment.
Figure 19B:
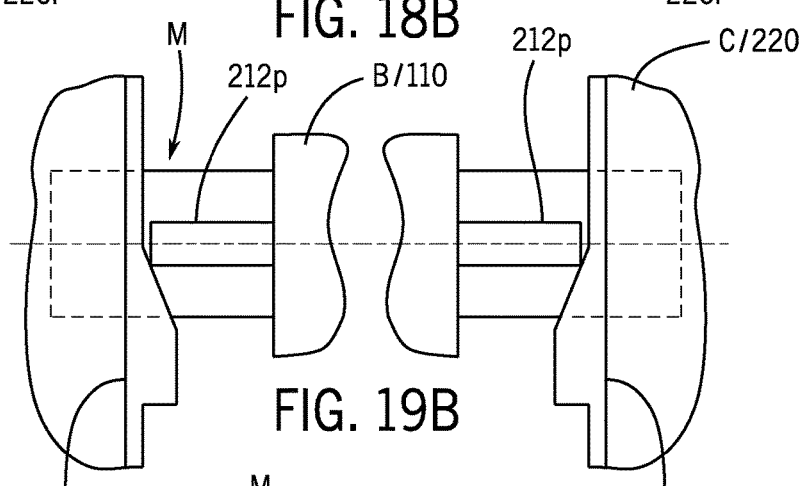
FIG. 19B is a schematic partial section view of a vehicle interior component according to an exemplary embodiment.
Figure 20A:
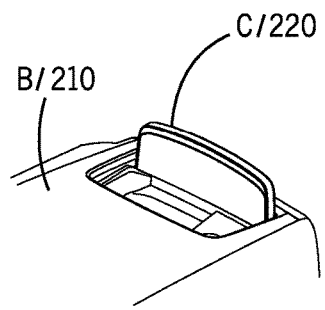
FIG. 20A is a schematic perspective view of a vehicle interior component according to an exemplary embodiment.
Figure 20B:
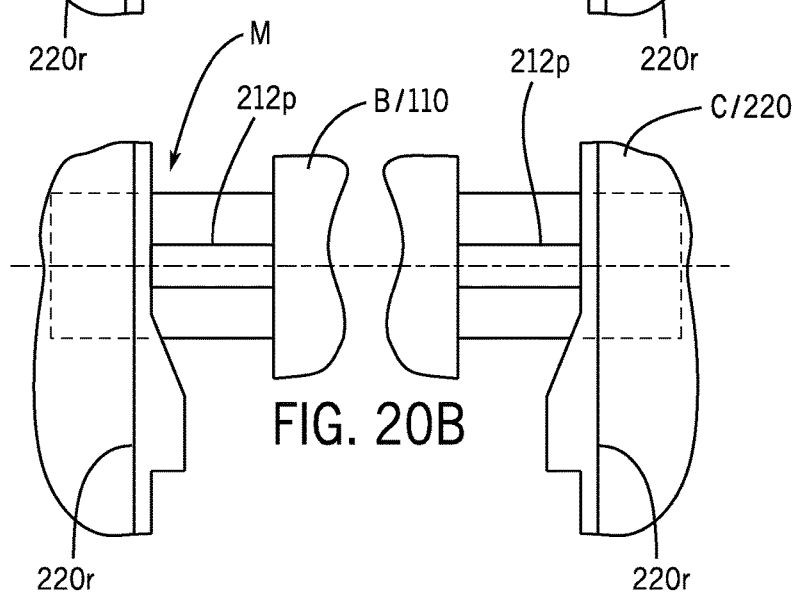
FIG. 20B is a schematic partial section view of a vehicle interior component according to an exemplary embodiment.
Figure 22A:
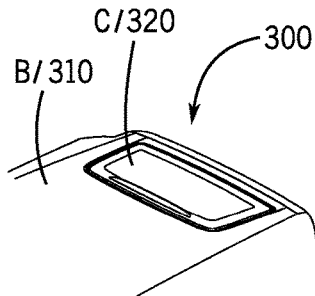
FIG. 22A is a schematic perspective view of a vehicle interior component according to an exemplary embodiment.
Figure 22B:
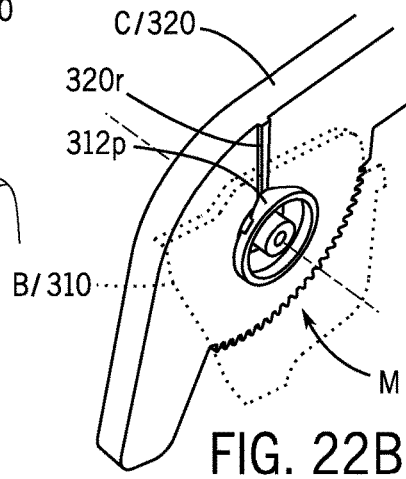
FIG. 22B is a schematic partial perspective view of a vehicle interior component according to an exemplary embodiment.
Figure 22C:
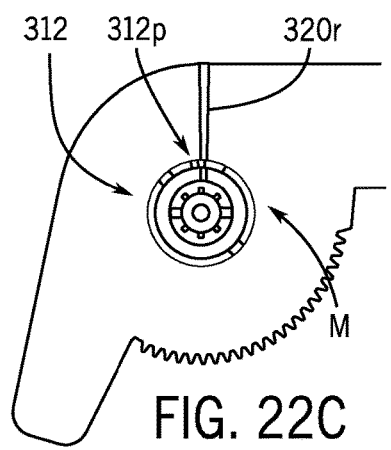
FIG. 22C is a schematic partial side view of a vehicle interior component according to an exemplary embodiment.
Figure 23A:
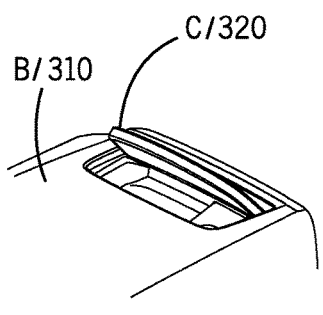
FIG. 23A is a schematic perspective view of a vehicle interior component according to an exemplary embodiment.
Figure 23B:
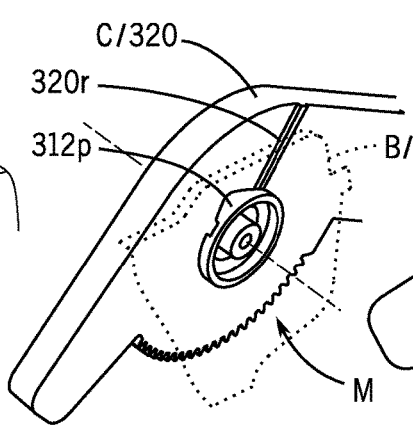
FIG. 23B is a schematic partial perspective view of a vehicle interior component according to an exemplary embodiment.
Figure 23C:
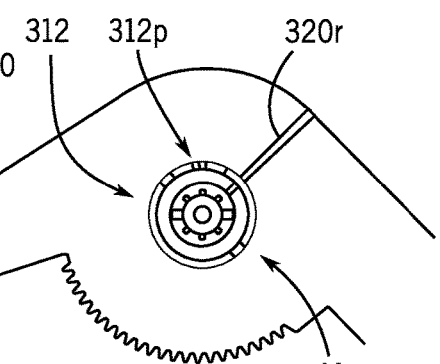
FIG. 23C is a schematic partial side view of a vehicle interior component according to an exemplary embodiment.
Figure 24A:
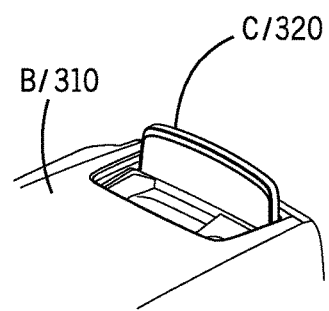
FIG. 24A is a schematic perspective view of a vehicle interior component according to an exemplary embodiment.
Figure 24B:
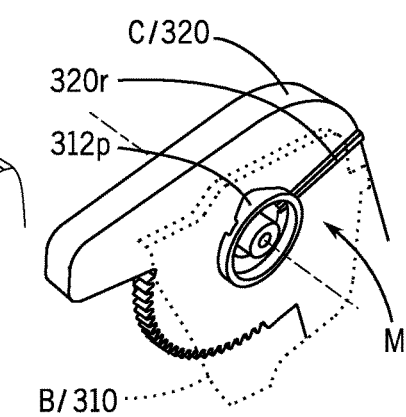
FIG. 24B is a schematic partial perspective view of a vehicle interior component according to an exemplary embodiment.
Figure 24C:
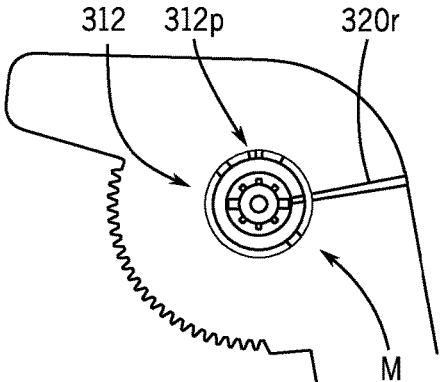
FIG. 24C is a schematic partial side view of a vehicle interior component according to an exemplary embodiment.

According to an exemplary embodiment shown schematically in FIGS. 4B, 5B and 6B, the component may comprise base B comprising a feature and cover C comprising a feature (e.g. to provide a joint J). See also FIGS. 7A-7C (feature 122p and feature 110r) and FIGS. 14A-14B (feature 220r and feature 212p) and FIGS. 21A-21B (feature 320r and feature 312p). According to an exemplary embodiment shown schematically in FIGS. 2A-2C, 3A-3C, cover C (e.g. door, etc.) may be configured to be rotated between a closed position and an open position relative to base B; cover C may be configured so that when cover C is in the closed position the feature of base B is in contact with the feature of cover C (e.g. engaged to establish a "fit" for visual/aesthetics, tolerance management, design intent, etc.). See e.g. FIGS. 4A-4B, 5A-5B, 6A-6B, 8A-8C, 11A-11B, 15A-15B, 18A-18B, 22A-22C and 25A-25B. According to an exemplary embodiment shown schematically in FIGS. 2A-2C and 3A-3C, cover C may comprise perimeter CP; base B may comprise an opening comprising perimeter BP; when cover C is in the closed position, perimeter BP of the opening of base B may be configured to provide a fit (shown as space S) for perimeter CP of cover C; the fit may comprise a fixed dimension within base B (e.g. a dimension/gap determined as a design standard and established by mechanism M at joint J between cover C and base B to provide a standard for purposes of visual appearance, tolerance stacking, etc.); the fit may comprise a flexible dimension for cover C (e.g. a dimension/gap that can accommodate variations in size of cover C relative to base B, etc. to maintain a suitable space S). See e.g. FIGS. 4A, 5A and 6A. According to an exemplary embodiment shown schematically in FIGS. 4A-4B, 5A-5B and 6A-6B, cover C may be configured to be rotated about an axis; when cover C is in the closed position a fit (e.g. shown by space S) of the perimeter of cover C within the perimeter of the opening of base B may be established adjacent to the axis as provided by the configuration/arrangement of a mechanism M at joint J (e.g. see exemplary embodiments of mechanism M in FIGS. 4B and 5B and 6B); the fit may comprise a space S between the perimeter of the cover and the perimeter of the opening of the base; the fit/space S may be determined adjacent to the axis (e.g. in alignment with the mechanism M/joint J). See also FIGS. 8A, 9A, 10A, 11A, 12A, 13A, 15A, 16A, 17A, 18A, 19A, 20A, 22A, 23A, 24A, 25A, 26A and 27A.

According to an exemplary embodiment shown schematically in FIGS. 4A-4B, 5A-5B and 6A-6B, the component may comprise a mechanism M comprising the feature of base B and the feature of cover C; the mechanism M may comprise a joint J; the joint J may be configured to facilitate movement of cover C relative to base B (e.g. force, internal friction, loosening/tightening, flexure/bending, etc. within the mechanism M at joint J to applied to move/rotate toward open position of cover C relative to base B) and to establish a fit shown as space S of cover C within an opening of base B (e.g. space S as fit of perimeter CP within perimeter BP adjacent to the axis of rotation of cover C relative to base B). See also FIGS. 7A-7D, 14A-14D and 21A-21D.

According to an exemplary embodiment shown schematically in FIGS. 4A-4B, 5A-5B, 6A-6B, 7A-7D, 14A-14D and 21A-21D, base B may comprise a pair of walls configured for attachment of cover C; the feature of base B may comprise a feature on each wall of the pair of walls; the fit may comprise a distance between the pair of walls of base B. See also FIGS. 7A-7C (feature 110r) and FIGS. 14A-14B (feature 212p) and FIGS. 21A-21B (feature 312p).

According to an exemplary embodiment shown schematically in FIGS. 4A-4B, 5A-5B, 6A-6B, 14A-14D and 21A-21D, cover C may comprise a pair of arms configured for attachment to base B; the feature of cover C may comprise a feature on each arm of the pair of arms; the fit may be determined at least partially by a distance between the pair of arms of cover C when cover C is in the closed position; the distance may be determined along an axis of rotation of cover C. See also FIGS. 7A-7C (feature 122p) and FIGS. 14A-14B (feature 220r) and FIGS. 21A-21B (feature 320r). Compare FIGS. 7A-7D (cover comprising a sidewall with features).

According to an exemplary embodiment shown schematically in FIGS. 4A-4B, 5A-5B and 6A-6B, the mechanism M at joint J may be configured so that a required applied force to move cover C between the closed position and the open position is variable as cover C moves from the closed position toward the open position (e.g. by engagement of features such as surfaces, protrusions, ribs, elements, cam elements, cam surfaces of the cover/base for the mechanism at the joint. Compare FIGS. 11A-11B (closed) with FIGS. 12A-12B and 13A-13B. Compare FIGS. 18A-18B (closed) with FIGS. 19A-19B and 20A-20B.

Compare FIGS. 25A-25B (closed) with FIGS. 26A-26B and 27A-27B.

According to an exemplary embodiment shown schematically in FIGS. 4A-4B, 5A-5B, 6A-6B, 7A-7D, 14A-14D and 21A-21D, each sidewall of the base comprising a feature for the mechanism M may comprise a flexible sidewall; the sidewalls may provide a force between the features of the mechanism M at the joint J (e.g. variation in engagement of features, flexure of the wall and/or arm of the cover and/or base, variations in the shape/profile of the engaging features, variations in a clamp force at/on the rib/projection/protrusion, variation in internal friction between surfaces, etc.); the cover may be installed within the sidewalls of the base; each arm of the cover may rotate either (a) within the sidewalls of the base or (b) outside of the sidewalls of the base. See e.g. FIGS. 11A-11B, 12A-12B, 13A-13B and FIGS. 18A-18B, 19A-19B, 20A-20B and FIGS. 25A-25B, 26A-26B, 27A-27B.

According to an exemplary embodiment shown schematically, the component may comprise a mechanism M shown as cam mechanism comprising the feature of the base B and the feature of the cover B (e.g. each feature engaging in a cam/follower arrangement, as cam surfaces, etc.). See e.g. FIGS. 8A-8C, 9A-9C, 10A-10C, 11A-11B, 12A-12B, 13A-13B and FIGS. 15A-15C, 16A-16C, 17A-17C, 18A-18B, 19A-19B, 20A-20B and FIGS. 22A-22B, 23A-23C, 24A-24C, 25A-25B, 26A-26B, 27A-27B.

According to an exemplary embodiment shown schematically in FIGS. 26A-26B and 27A-27B, the cover may be configured so that when the cover is moved toward the open position the feature of the cover is separated from the base (e.g. facilitating movement of the cover relative to the base toward the open position by reduction in force at the joint and/or by the mechanism/features on the cover/base). Compare FIGS. 25A-25B (showing engagement to maintain a holding force within the joint and/or by the mechanism/features on the cover/base). According to an exemplary embodiment shown schematically, the cover may be configured so that when the cover is moved toward the open position the feature of the base is separated from the cover (e.g. facilitating movement of the cover relative to the base toward the open position); when the cover is in the closed position the feature of the cover may be in axial alignment with the feature of the base. See e.g. FIGS. 4A-4B, 5A-5B and 6A-6B and FIGS. 15A-15C, 16A-16C, 17A-17C, 18A-18B, 19A-19B, 20A-20B and FIGS. 22A-22B, 23A-23C, 24A-24C, 25A-25B, 26A-26B, 27A-27B. According to an exemplary embodiment shown schematically, the feature of the base may be disengaged (e.g. completely separated or substantially separated such as by the feature shown as surface/cam/follower profile position in rotation of the cover relative to the base at the mechanism/joint) from the feature of the cover when the cover is rotated from the closed position to the open position so that a required/applied opening force for the cover is reduced (e.g. facilitating movement of the cover relative to the base toward the open position by a vehicle occupant). See e.g. FIGS. 12A-12B, 13A-13B, 19A-19B, 20A-20B, 26A-26B and 27A-27B. According to an exemplary embodiment shown schematically, the feature of the base may be engaged (e.g. generally fully engaged/in contact) with the feature of the cover when the cover is rotated into the closed position so that the cover is retained closed/fit relative to the base. See FIGS. 2A, 3A, 4A, 5A, 6A, 8A, 11A, 15A, 18A, 22A and 25A.

According to an exemplary embodiment shown in FIGS. 4A-4B, 5A-5B, 6A-6B, 7A-7D, 14A-14D and 21A-21D, the component may comprise base B and cover C coupled to the base with mechanism M at joint J comprising a feature on the base and a feature on the cover; the cover may be configured to be rotated between a closed position and an open position relative to the base; the mechanism may be configured so that when the cover is in the closed position the feature on the cover is in axial alignment with the feature on the base. See e.g. FIGS. 11A-11B, 12A-12B, 13A-13B, 18A-18B, 19A-19B, 20A-20B, 25A-25B, 26A-26B and 27A-27B. According to an exemplary embodiment shown schematically, the mechanism may be configured so that the feature on the base engages the feature on the cover when the cover is rotated from the open position to the closed position; the mechanism may be configured so that the feature on the base disengages the feature on the cover when the cover is rotated from the closed position toward the open position. According to an exemplary embodiment shown schematically in FIGS. 11A-11B, 12A-12B, 13A-13B, 18A-18B, 19A-19B, 20A-20B, 25A-25B, 26A-26B and 27A-27B, the mechanism may comprise a cam mechanism; the feature on the base may comprise a surface such as a cam surface; the feature on the base may comprise a follower. According to an exemplary embodiment shown schematically in FIGS. 7A-7D, 14A-14D, 21A-21D, the mechanism M may be configured to facilitate movement of the cover to the open position; the mechanism M may comprise a pivot joint J (see FIGS. 4A-4B, 5A-5B and 6A-6B); the pivot joint may comprise features shown as a set of projections in an alignment/arrangement at or to provide an axis of rotation for the cover. See e.g. FIGS. 11A-11B, 12A-12B, 13A-13B, 18A-18B, 19A-19B, 20A-20B, 25A-25B, 26A-26B and 27A-27B.

According to an exemplary embodiment shown schematically in FIGS. 4B, 5B and 6B, the pivot joint J may comprise the feature on the cover C and the feature on the base B. According to an exemplary embodiment shown schematically in FIGS. 2A-2C, 3A-3C, A, 5A and 6A, the base B may comprise an opening OP having a perimeter BP; the cover C may comprise a perimeter CP; when the cover is in the closed position the perimeter of the cover may be configured for a fit shown as space S (adjacent to the axis of rotation) within the perimeter of the opening of the base. See also FIGS. 7A-7D, 14A-14D and 21A-21D. According to an exemplary embodiment shown schematically in FIGS. 4A-4B, 5A-5B and 6A-6B, the mechanism M and joint J may be configured to establish the fit of the cover within the opening of the base; the mechanism may comprise an axis of rotation of the cover relative to the base; the fit of the perimeter of the cover within the perimeter of the opening of the base may be established adjacent to the axis; the fit may comprise a space between the perimeter of the cover and the perimeter of the opening of the base. See e.g. FIGS. 2A-2C and 3A-3C. According to an exemplary embodiment shown schematically in FIGS. 4A-4B, 5A-5B and 6A-7B, the mechanism M at joint J may be configured to maintain the space S for the fit between the perimeter CP of the cover and the perimeter BP of the opening of the base. See also FIGS. 2A-2C and 3A-3C. According to an exemplary embodiment shown schematically in FIGS. 7A-7D, 11A-11B, 12A-12B and 13A-13D, the mechanism may be configured so that the feature on the cover maintains engagement with the feature on the base when the cover is moved from the closed position to the open position. See also FIGS. 2A-2C, 3A-3C and 4A-4B. According to an exemplary embodiment shown schematically in FIGS. 7A-7D, 11A-11B, 12A-12B and 13A-13D, the mechanism and/or the joint may comprise a spring configured to be seated/installed at the joint; the spring shown as torsion spring 140 in FIG. 7A may be configured to facilitate rotation of the cover relative to the base. See also FIGS. 14A and 21A (e.g. exemplary embodiments with spring at the joint shown as torsion spring 240 and torsion spring 340). Component 100 may comprise a latch 150 configured to hold cover 120 in the closed position.

According to an exemplary embodiment shown schematically in FIGS. 4A-4B, 5A-5B, 6A-6B, 7A-7D, 14A-14D, 21A-21D, the mechanism M may comprise a joint J; the joint J may comprise a pivot member/axle shows as comprising at least one shaft (e.g. post, pin, hub, etc.); the at least one shaft may comprise a pivot pin such as post on the cover (e.g on sidewall/arm, etc.) or on the base (e.g. on wall, etc.); the joint may comprise a set of projections (e.g. comprising a pivot member, axle, pin, post, etc.) to provide an axis and/or in alignment with an axis of rotation for the cover relative to the base. See e.g. FIGS. 11A-11B, 12A-12B, 13A-13B, 18A-18B, 19A-19B, 20A-20B, 25A-25B, 26A-26B and 27A-27B.

According to an exemplary embodiment, a vehicle interior component may comprise a base; a cover coupled to the base; a cam mechanism comprising a cam surface and a follower (e.g. providing a cam element/follower with a shape/form and a cam surface with a surface profile). See FIGS. 4A-4B, 5A-5B, 6A-6B, 7A-7D, 14A-14D, 21A-21D. According to an exemplary embodiment shown schematically, the cover may be configured to be rotated between a closed position and an open position relative to the base; the cam mechanism may be configured so that the follower engages the cam surface when the cover is rotated between the closed position and the open position. See e.g. FIGS. 11A-11B, 12A-12B, 13A-13B, 18A-18B, 19A-19B, 20A-20B, 25A-25B, 26A-26B and 27A-27B. According to an exemplary embodiment indicated schematically, the base may comprise the cam surface; the cover may comprise the follower. According to an exemplary embodiment shown schematically in FIGS. 21A-21D, a cam mechanism may be configured so that the follower on the cover disengages (see FIGS. 25A-25B, 26A-26B and 27A-27B) the cam surface on the base when the cover is rotated between the closed position and the open position. Compare FIGS. 11A-11B, 12A-12B, 13A-13B and FIGS. 18A-18B, 19A-19B, 20A-20B. According to an exemplary embodiment shown schematically, the cover may comprise the cam surface; the base may comprise the follower; the cam mechanism may comprise an axis of rotation of the cover relative to the base.

According to an exemplary embodiment shown schematically in FIGS. 2A-2C and 3A-3C, a component for a vehicle interior may comprise a base B and a cover C configured to be installed to the base and for movement relative to the base at a joint J between a closed position and an open position. See also FIGS. 4A-4B, 5A-5B and 6A-6B. According to an exemplary embodiment shown schematically in FIGS. 25B and 26B, the joint may comprise a projection and a ramp; one of the projection and the ramp may be configured to slide along the other of the projection and the ramp as the cover moves between the closed position and the open position; the ramp may comprise at least one of (a) a cam; (b) an incline.

According to an exemplary embodiment shown schematically in FIGS. 6A-6B, 21A-21D, 25A-25B, 26A-26B and 27A-27B, the component may comprise a cover C pivotally coupled to a base B at a joint J comprising a mechanism M comprising features on the base/cover (e.g. in alignment with an axis of rotation for cover relative to base). As shown schematically in FIGS. 21A-21D, the feature on the wall of the base B/310 may comprise a projection 312 providing a rim/cam surface 312p; the feature on the arm of the cover C/320 may comprise a protrusion shown as rib/surface/follower 320r. As shown schematically in FIGS. 22A-22C, 23A-23C and 24A-24C, the mechanism M comprising feature 320r on the cover C configured for engagement/disengagement with feature 312p on the base B provides a pivot joint for movement of the cover C relative to the base B; cover C is configured for rotation relative to base B from a closed position (indicated schematically in FIGS. 22A-22C) through an intermediate position (indicated schematically in FIGS. 23A-23C) to an open position (indicated schematically in FIGS. 24A-24C). See also FIGS. 2A-2C, 3A-3C and 6B.

As indicated schematically in FIGS. 25A-25B, 26A-26B and 27A-27B, when the cover C is moved to the open position a gap G may be provided (e.g. within joint/mechanism) between the feature shown as protrusion/rib 320r of the cover C (see FIGS. 21C and 21D) and the feature shown as surface/cam element 312p of the base B (see FIGS. 21B and 21D). See also FIGS. 22A-22C, 23A-23C and 24A-24C. As shown schematically in FIGS. 22A-22C, 23A-23C and 24A-24C, feature 320r of the cover C/320 may comprise a protrusion configured to engage (for closing/fit as shown in FIGS. 25A-25B) and disengage (e.g. for opening as shown in FIGS. 26A-26B and 27A-27B) with a surface/cam surface of the feature 312p of the base B/310. See also FIGS. 6A-6B (e.g. showing maintenance/management of fit/space S for perimeter CP of cover C and for perimeter BP for opening of base B) and FIGS. 25A-25B (with no gap between features 312p/320r within mechanism M when cover C/320 is closed relative to base B/310).

According to an exemplary embodiment shown schematically in FIGS. 21A-21D, 23A-23C, 24A-24B, 26A-26B and 27A-27B, the mechanism M may be configured to facilitate movement of the cover C relative to the base B by reducing the required applied force during movement of the cover C from the closed position toward the open position relative to the base B by disengagement of feature/surface 312p and feature/surface 320r of mechanism at the joint (e.g. disengagement of elements of the mechanism along the axis of rotation to free/loosen the pin/axle members for rotation within the joint). See also FIGS. 2B-2C and 3B-3C. According to an exemplary embodiment shown schematically in FIGS. 21A-21D, 22A-22C, 25A-25C, the mechanism M may be configured so that the feature/element 320r on the cover C engages the feature/element 312p on the base B when the cover C is moved to the closed position relative to the base B (e.g. by cam/follower action between the features within the mechanism) to establish the fit (e.g. visual space/appearance between the perimeter CP of the cover C relative to the perimeter BP of the opening for the base B). See also FIGS. 2A, 3A and 6A.

According to an exemplary embodiment, the cover may comprise at least one of a door, a bin, a sunglass bin, etc. According to an exemplary embodiment, the component may comprise at least one of a console, a floor console, a center console, an overhead console, a center stack, an instrument panel, a door panel, a storage compartment, etc.

EXEMPLARY EMBODIMENTS

According to an exemplary embodiment as shown schematically in FIGS. 4A, 4B, 5A, 5B, 7A-7D, 8A-8C, 9A-9C, 10A-10C, 11A, 11B, 12A, 12B, 13A, 13B, 14A-14D, 15A-15C, 16A-16C, 17A-17C, 18A, 18B, 19A, 19B, 20A and 20B a component for a vehicle interior may comprise a base and a cover configured to be installed to the base and configured for movement relative to the base at a joint between a closed position and an open position. The joint may comprise a projection and a ramp. One of the projection and the ramp may be configured to slide along the other of the projection and the ramp as the cover moves between the closed position and the open position. The ramp may comprise at least one of (a) a cam; (b) an incline. The component may comprise a gap between the projection and the ramp when the cover is in the open position. The joint may comprise a pivot joint; movement may comprise rotation. The cover may comprise at least one of (a) a door; (b) a bin; (c) a sunglass bin. The component may comprise at least one of (a) a console; (b) a floor console, (c) a center console, (d) an overhead console, (e) a center stack, (f) an instrument panel, (g) a door.

As shown schematically in FIGS. 7A-7D, 8A-8C, 9A-9C, 10A-10C, 11A, 11B, 12A, 12B, 13A and 13B, the component 100 may comprise an overhead console comprising a base 110 and a cover 120. Component 100 may comprise a bezel 130. Base 110 may comprise a ramp 110r. Base 110 may comprise a first surface 111 and a second surface 113. Base 110 may comprise a ramped surface 112 connecting first surface 111 and second surface 113. Cover 120 may comprise a shaft 122. Shaft 122 may comprise a projection 122p. Component 100 may comprise a joint J comprising projection 122p and ramp 110r. Projection 122p may be configured to slide along ramp 110r as cover 120 moves between the closed position (see FIGS. 8A-8C and 11A-11B) and the open position (see FIGS. 10A-10C and 13A-13B). Ramp 110r may comprise at least one of (a) a cam; (b) an incline. Component 100 may comprise a gap between the projection 122p and ramp 110r when cover 120 is in the open position. Joint J of component 100 may comprise a pivot joint; movement may comprise rotation. Cover 120 may comprise at least one of (a) a door; (b) a bin; (c) a sunglass bin. Component 100 may comprise at least one of (a) a console; (b) a floor console, (c) a center console, (d) an overhead console, (e) a center stack, (f) an instrument panel, (g) a door.

As shown schematically in FIGS. 14A-14D, 15A-15C, 16A-16C, 17A-17C, 18A, 18B, 19A, 19B, 20A and 20B, the component 200 may comprise a base 230 and a cover 220. Base 230 may comprise a bin 210. Bin 210 may comprise a shaft 212. Shaft 212 may comprise a projection 212p. Cover 220 may comprise a ramp 220r. Component 200 may comprise a joint J comprising projection 212p and ramp 220r. Ramp 220r may be configured to slide along projection 212p as cover 220 moves between the closed position (see FIGS. 15A-15C and 18A-18B) and the open position (see FIGS. 17A-17C and 20A-20B). Ramp 220r may comprise at least one of (a) a cam; (b) an incline. Component 200 may comprise a gap between projection 212p and ramp 220r when cover 220 is in the open position. Joint J of component 200 may comprise a pivot joint; movement may comprise rotation. Cover 220 may comprise at least one of (a) a door; (b) a bin; (c) a sunglass bin. Component 200 may comprise at least one of (a) a console; (b) a floor console, (c) a center console, (d) an overhead console, (e) a center stack, (f) an instrument panel, (g) a door.

According to an exemplary embodiment as shown schematically in FIGS. 4A, 4B, 5A, 5B, 7A-7D, 8A-8C, 9A-9C, 10A-10C, 11A, 11B, 12A, 12B, 13A, 13B, 14A-14D, 15A-15C, 16A-16C, 17A-17C, 18A, 18B, 19A, 19B, 20A and 20B, a component for a vehicle interior may comprise a base, a cover configured to be installed to the base and configured for movement relative to the base at a joint between a closed position and an open position. At least one of (a) the base; (b) the cover may be configured to flex at the joint as the cover moves from the closed position toward the open position. As shown schematically in FIGS. 7A-7D, 11A, 11B, 12A, 12B, 13A and 13B, at least one of base 110; cover 120 of component 100 may be configured to flex at joint J of component 100 as cover 120 moves from the closed position (see FIGS. 11A-11B) toward the open position (see FIGS. 13A-13B). As shown schematically in FIGS. 14A-14D, 18A, 18B, 19A, 19B, 20A and 20B, at least one of (a) base 230; (b) cover 220 of component 200 may be configured to flex at joint J of component 200 as cover 220 moves from the closed position (see FIGS. 18A-18B) toward the open position (see FIGS. 20A-20B).

According to an exemplary embodiment as shown schematically in FIGS. 4A, 4B, 5A, 5B, 7A-7D, 8A-8C, 9A-9C, 10A-10C, 11A, 11B, 12A, 12B, 13A, 13B, 14A-14D, 15A-15C, 16A-16C, 17A-17C, 18A, 18B, 19A, 19B, 20A and 20B, a component for a vehicle interior comprising a base, a cover configured to be installed to the base and configured for movement relative to the base at a joint between a closed position and an open position. The joint may comprise a projection, a first surface and a second surface. The projection may be configured to engage the first surface when the cover is in the closed position. The projection may be configured to engage the second surface when the cover is in the open position. As shown schematically in FIGS. 7A-7D, 8A-8C, 9A-9C, 10A-10C, 11A, 11B, 12A, 12B, 13A, 13B, joint J of the component 100 may comprise projection 122p, a first surface 111 and a second surface 113. Projection 122p may be configured to engage first surface 111 when cover 120 is in the closed position (see FIGS. 8A-8C, 11A and 11B). Projection 122p may configured to engage second surface 113 when cover 120 is in the open position (see FIGS. 10A-10C, 13A and 13B).

According to an exemplary embodiment shown schematically, a component for a vehicle interior may comprise a base and a cover configured to be installed to the base and for movement relative to the base at a joint between a closed position and an open position; at least one of the base and/or the cover may be configured to flex at the joint as the cover moves from the closed position toward the open position. See e.g. FIGS. 7A-7D, 11A-11B, 12A-12B, 13A-13B, 14A-14D, 18A-18B, 19A-19B, 20A-20B.

According to an exemplary embodiment shown schematically in FIGS. 2A-2C, 3A-3C, 4A-4B, 5A-5B, 6A_6B, 7A-7D, 14A-14D and 21A-21D, a component for a vehicle interior may comprise a base B and a cover C configured to be installed to the base and for movement relative to the base at a joint J (on an axis) between a closed position and an open position; the joint J may comprise a feature shown as a projection and a feature shown as a cam surface (e.g. first surface and a second surface); the projection may be configured to engage the first surface when the cover is in the closed position; the projection may be configured to engage the second surface when the cover is in the open position. See e.g. FIGS. 11A-11B, 12A-12B, 13A-13B, 18A-18B, 19A-19B, 20A-20B.

According to an exemplary embodiment shown schematically in FIGS. 2A-2C, 3A-3C, 4A-4B, 5A-5B, 6A_6B, 7A-7D, 14A-14D and 21A-21D, the vehicle interior component may comprise a base providing an opening having a perimeter; a cover having a perimeter; a joint coupling the cover to the base; the cover may be configured to rotate about an axis between a closed position and an open position relative to the opening of the base; when the cover is in the closed position the perimeter of the cover may be configured for a fit within the perimeter of the opening of the base. According to an exemplary embodiment shown schematically in FIGS. 2A-2C, 3A-3C, 4A-4B, 5A-5B, 6A-6B, the joint J (with mechanism M) may be configured to establish the fit of the cover within the opening of the base; the joint may be configured so that a required applied force to move the cover between the closed position and the open position is variable as the cover rotates from the closed position toward the open position. According to an exemplary embodiment shown schematically in FIGS. 2A-2C, 3A-3C, 4A, 5A and 6A, the fit/space S of the perimeter CP of the cover within the perimeter BP of the opening of the base adjacent to the axis may comprise a space between the perimeter of the cover and the perimeter of the opening of the base; the joint J may be configured to maintain the space between the perimeter of the cover and the perimeter of the opening of the base. According to an exemplary embodiment shown schematically in FIGS. 14A-14D, 18B, 19B and 20B, the joint may comprise a set of projections to provide an axis; the joint may comprise a feature on the cover and a feature on the base.

According to an exemplary embodiment, the cover may comprise at least one feature comprising a cam surface; the base may comprise at least one feature comprising a cam surface; the base may comprise a feature comprising a follower; the joint may comprise a mechanism comprising a feature on the cover and a feature on the base. According to an exemplary embodiment shown schematically, the mechanism may be configured so that the feature on the cover engages the feature on the base when the cover is moved to the closed position; the mechanism may be configured so that the feature on the cover disengages from the feature on the base when the cover is moved from the closed position to the open position; when the feature on the cover disengages from the feature on the base the feature on the cover may be separated from the feature on the base. According to an exemplary embodiment shown schematically, the mechanism may be configured to facilitate movement of the cover by reducing the required applied force during movement of the cover from the closed position toward the open position. According to an exemplary embodiment shown schematically, engagement of the feature on the base with the feature on the cover may establish the space of the fit between the perimeter of the cover and the perimeter of the opening of the base.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A vehicle interior component comprising:
a base;
a cover coupled to the base at a pivot joint; and
a mechanism comprising a projection and a ramp;
wherein the cover is configured to be rotated between a closed position and an open position relative to the base;
wherein the pivot joint is configured to provide an axis of rotation for the cover relative to the base;
wherein the mechanism comprises a first surface and a second surface;
wherein the projection is configured to engage the first surface when the cover is in the closed position;
wherein the projection is configured to engage the second surface when the cover is in the open position.

2. The component of claim 1 wherein the base comprises the first surface and the second surface.

3. The component of claim 1 wherein the cover comprises the projection and the base comprises the ramp.

4. The component of claim 1 wherein the projection is configured to engage the ramp as the cover moves between the closed position and the open position.

5. The component of claim 1 wherein one of the projection and the ramp is configured to slide along the other of the projection and the ramp as the cover moves between the closed position and the open position.

6. The component of claim 1 wherein at least one of (a) the base; (b) the cover is configured to flex at the pivot joint as the cover moves from the closed position toward the open position.

7. The component of claim 1 wherein the mechanism is configured so that the projection disengages the ramp when the cover is rotated from the closed position toward the open position.

8. The component of claim 1 wherein the mechanism is configured so that the projection engages the ramp when the cover is rotated from the open position to the closed position.

9. The component of claim 1 wherein the base comprises an opening having a perimeter; wherein the cover comprises a perimeter; wherein when the cover is in the closed position the perimeter of the cover is configured for a fit within the perimeter of the opening of the base; wherein the mechanism is configured to establish the fit of the cover within the opening of the base.

10. The component of claim 9 wherein the fit of the perimeter of the cover within the perimeter of the opening of the base is established adjacent to the axis of rotation for the cover; wherein the fit comprises a space between the perimeter of the cover and the perimeter of the opening of the base; wherein the mechanism is configured to maintain the space between the perimeter of the cover and the perimeter of the opening of the base.

11. The component of claim 1 wherein the mechanism comprises a spring; wherein the spring is configured to facilitate rotation of the cover relative to the base.

12. The component of claim 1 wherein the pivot joint comprises at least one of (a) a shaft; (b) a pin; (c) a pivot pin; (d) an aperture; (e) a recess; (f) a pin in a recess; (g) an axle (h) a post; (i) a member; (j) a hub.

13. The component of claim 1 wherein the mechanism is configured so that when the cover is in the closed position the projection is in axial alignment with the first surface.

14. The component of claim 1 wherein the ramp comprises a surface between the first surface and the second surface.

15. The component of claim 1 wherein the projection is disengaged from the ramp when the cover is rotated from the closed position to the open position so that a required opening force for the cover is reduced.

16. The component of claim 1 wherein the ramp comprises at least one of (a) a cam; (b) a cam surface; (c) an incline; (d) a protrusion; (e) a rib.

17. The component of claim 1 wherein the mechanism comprises a cam mechanism; wherein the projection comprises at least one of (a) a cam element; (b) a cam surface; (c) a follower.

18. The component of claim 1 wherein the cover comprises at least one of (a) a door; (b) a bin; (c) a sunglass bin.

19. The component of claim 1 comprising at least one of (a) a console; (b) a floor console, (c) a center console, (d) an overhead console, (e) a center stack, (f) an instrument panel, (g) a door.

* * * * *